United States Patent
Daniels

(10) Patent No.: US 6,632,952 B1
(45) Date of Patent: Oct. 14, 2003

(54) AGRICULTURAL OIL PROCESSING USING POTASSIUM HYDROXIDE

(75) Inventor: Ralph S. Daniels, Sherman, TX (US)

(73) Assignee: Carrie Lee Mahoney, Southbury, CT (US)

( * ) Notice: Subject to any disclaimer, the term of this patent is extended or adjusted under 35 U.S.C. 154(b) by 0 days.

(21) Appl. No.: 08/261,863

(22) Filed: Jun. 17, 1994

Related U.S. Application Data

(63) Continuation-in-part of application No. 08/235,655, filed on Apr. 29, 1994, which is a continuation of application No. 07/925,814, filed on Aug. 4, 1992, now Pat. No. 5,308,372, which is a continuation of application No. 07/598,777, filed on Oct. 16, 1990, now abandoned, which is a continuation of application No. 07/197,058, filed on May 20, 1988, now abandoned, which is a continuation-in-part of application No. 07/179,280, filed on Apr. 8, 1988, now Pat. No. 4,836,843, which is a continuation of application No. 06/886,937, filed on Jul. 21, 1986, which is a continuation of application No. 06/738,742, filed on May 29, 1985, which is a continuation of application No. 06/575,455, filed on Jan. 31, 1984, which is a continuation-in-part of application No. 06/572,202, filed on Jan. 18, 1984.

(51) Int. Cl.[7] ................................. C11B 3/06
(52) U.S. Cl. ..................................... 554/178
(58) Field of Search ......................... 584/178

(56) References Cited

U.S. PATENT DOCUMENTS

| | | |
|---|---|---|
| 2,288,418 A | 6/1942 | Partridge |
| 2,758,122 A | 8/1956 | Clayton |
| 2,812,343 A | 10/1957 | Cox et al. |
| 2,848,468 A | 8/1958 | Wijnberg |
| 2,876,242 A | 3/1959 | Thurman |
| 2,877,249 A | 3/1959 | Kelley |
| 2,917,525 A | 12/1959 | Thurman |
| 2,939,790 A | 6/1960 | Clayton |
| 2,970,910 A | 2/1961 | Thurman |
| 2,991,178 A | 7/1961 | Clayton |
| 3,008,972 A | 11/1961 | Mitani |
| 3,093,667 A | 6/1963 | Fiala |
| 3,102,898 A | 9/1963 | Schmitt |
| 3,425,938 A | 2/1969 | Bloomberg et al. |
| 3,428,660 A | 2/1969 | Morren |
| 3,576,709 A | 4/1971 | Menzies |
| 3,629,307 A | 12/1971 | Marino et al. |
| 3,653,842 A | 4/1972 | Putman |
| 3,700,704 A | 10/1972 | Zambone |

(List continued on next page.)

FOREIGN PATENT DOCUMENTS

| | | |
|---|---|---|
| DE | 976932 | 8/1964 |
| DE | 1963002 | 6/1971 |
| GB | 774532 | 5/1957 |
| SU | 571506 | 9/1977 |
| SU | 715565 | 2/1980 |

OTHER PUBLICATIONS

Daniel, Chem. abstr. of WO/8503285, 1985.*
Woerfel, "Alternatives for the Processing of Soap–stock", Journal of the American Oil Chemists'Society, vol. 60, Feb. 1983.

(List continued on next page.)

Primary Examiner—Deborah D. Carr
(74) Attorney, Agent, or Firm—Blodgett & Blodgett, P.C.

(57) ABSTRACT

A method of processing agricultural oil in which non-toxic reagents are used, so that a waste stream is evolved suitable for use as a nutrient source and wherein the non-toxic reagents include nutrient source and wherein the non-toxic reagents include nutrient components whereby the nutrient value of the waste stream is enhanced. A variation of convention refining is detailed in which potassium hydroxide is used as refining caustic instead of conventional sodium hydroxide. The resulting process exhibits improvements in waste wash characteristics, more complete oil recovery, less oil in the soapstock, reduced interlayer formation, more soap removed from the refined oil into the soapstock stream, and a less viscous soapstock.

21 Claims, 7 Drawing Sheets

U.S. PATENT DOCUMENTS

| | | |
|---|---|---|
| 3,708,275 A | 1/1973 | Camp, Jr. |
| 3,787,460 A | 1/1974 | Gadefaix et al. |
| 3,804,819 A | 4/1974 | Wengrow et al. |
| 3,856,834 A | 12/1974 | Marsden et al. |
| 3,926,610 A | 12/1975 | Kenton |
| 3,943,155 A | 3/1976 | Young |
| 3,974,069 A | 8/1976 | Nettli |
| 3,975,270 A | 8/1976 | Teranishi et al. |
| 4,035,402 A | 7/1977 | Levine |
| 4,100,181 A | 7/1978 | Phillips et al. |
| 4,118,407 A * | 10/1978 | Red et al. .................. 554/178 |
| 4,179,457 A | 12/1979 | Crawford |
| 4,188,290 A | 2/1980 | Graham et al. |
| 4,229,202 A | 10/1980 | Mullerheim et al. |
| 4,276,227 A | 6/1981 | Kirby |
| 4,280,962 A | 7/1981 | Watanabe et al. |
| 4,361,517 A | 11/1982 | Duff et al. |
| 5,308,372 A * | 5/1994 | Daniels ......................... 71/25 |

OTHER PUBLICATIONS

Eckenfelder "Wastewater Treatment" *Chemical Engineering*, Sep. 1985 pp60–74.

Institute of Shortening and Edible Oils, Inc. "Treatment of Wastwaters from Food Oil Processing Plants in Municipal Facilities" Oct. 1985.

"Proceedings: World Conference on Emerging Technologies in the Fats and Oils Industry" American Oil Chemists' Soceity Aug.–Sep. 1986 pp146–149, 149–153, 165–168.

Daniels "Fertilizer Process", International Patent Application PCT/US85/00078 published Aug. 1, 1985.

Chemcial Abstracts, vol. 92, No. 23, p. 584.

* cited by examiner

DANIELS FERTILIZER PROCESS

PROCESS FLOW CHART

AGRICULTURAL OIL PROCESSING USING POTASSIUM HYDROXIDE

REFERENCE TO RELATED APPLICATIONS

This application is a continuation-in-part of application Ser. No. 08/235,655 filed Apr. 29, 1994 which is a continuation of Ser. No. 07/925,814, filed Aug. 4, 1992, now U.S. Pat. No. 5,308,372, issued May 2, 1994; which was a continuation of application Ser. No. 07/598,777, filed Oct. 16, 1990, now abandoned; which was a continuation of Ser. No. 07/197,058, filed May 20, 1988, now abandoned; which was a continuation-in-part of application Ser. No. 07/179,280, filed Apr. 8, 1988, now U.S. Pat. No. 4,836,843 issued Jun. 6, 1989; which is a continuation of Ser. No. 06/886,937, filed Jul. 21, 1986; which was a continuation of Ser. No. 06/738,742, filed May 29, 1985; which as a continuation of Ser. No. 06/575,455, filed Jan. 31, 1984; which was a continuation-in-part of Ser. No. 06/572,202, filed Jan. 18, 1984.

TECHNICAL FIELD OF THE INVENTION

This invention involves both the field of agricultural oil refining and the field of nutrient material manufacture.

BACKGROUND OF THE INVENTION

Vegetable Oil Refining and Waste Water

Vegetable oils are natural fats which occur in the seeds of oil-seed plants such as soybean, cotton, corn and sunflower. Other agricultural oils are fish oils, animal fats and mixed vegetable-fish-fats.

The oils are solvent extracted and refined for edible use as cooking oil (e.g., Wesson Oil™), shortening (e.g., Crisco™), salad dressings, mayonnaise and margarines.

Agricultural oil refining essentially involves the removal of free fatty acids (FFA) and gums (to a lesser extent) form the crude oil. Gum removal is sometimes facilitated by addition of traces of phosphoric acid. The refining is accomplished by mixing the oil with a hot, aqueous caustic solution (sodium hydroxide) and centrifugally separating the reaction products from the "refined" oil. The waste product, an alkaline mixture of saponified FFA and gums is referred to as soapstock.

The soapstock waste has commercial value, because of the fatty acid content as a high energy feed supplement, but must be processed further in order to render it salable. Processing simply amounts to breaking or splitting the soap into oil and water again by adding acid (Sulfuric acid) to approximately pH 1.5. After heating and mixing thoroughly, the acidulated soapstock is allowed to settle out. The oil that floats to the top is called "acid oil" and is drawn off for sale usually as an animal feed supplement. The aqueous phase remaining is termed "acid water". Acid water is the final waste product and is discarded. However, there is a disposal problem. Acid water contains all the undesirable and objectionable pollutants of the refining process. Sewer authorities at a bare minimum require that the acid water be neutralized (NaOH is added) before the waste is allowed to be dumped. Some states have more stringent pollution control and have forced companies out of business because of acid water disposal.

Thus, in the conventional refining of agricultural oils, sodium hydroxide is used as the refining base, sulfuric acid used to acidulate soapstock and sodium hydroxide again employed to neutralize acid water.

Although established and inexpensive, this technology results in a waste product that, due to environmental legislation, has become increasingly difficult and costly to dispose of.

Furthermore, in conventional sodium hydroxide refining the refined oil which exits the centrifuge or separator must be processed through a number of water wash unit operations in order to remove any water soluble components from the refined oil. These water wash steps, in which water is mixed into the oil and then separated from the oil, produce a waste water stream with extremely low levels of water soluble components.

Moreover, it has been found that sodium hydroxide refining does not always result in an optimum degree of clarity in the refined oil.

Also, the sodium hydroxide process does not maximize the amount of refined oil recovered from a given amount of crude substrate. At the same time, the sodium hydroxide process has not been found to minimize the amount of oil lost to the soapstock where it adds to the volume of what is normally a waste stream with disposal costs associated with it.

Also, the sodium hydroxide process is found to have significant problems with an "interlayer" or "gum' which creates purification problems (degumming) because the amount of the interlayer tends to reduce the amount and purity of the desired refined oil.

Furthermore, the sodium hydroxide process does not appear to maximize the separation of refined oil from soapstock. The value of the soap can be more readily realized when it is part of the soapstock stream rather than representing trace impurities in the refined oil stream.

Also, the soapstock from the conventional sodium hydroxide process possesses less than optimal viscosity, depending on the concentration, causing difficulties in handling and transport, especially when refining and acidulation are conducted significant distance apart. It is then necessary to load the soapstock into railroad tank cars, tank trucks or barges, at which point that viscosity of the soapstock complicates and increases the cost of transport.

Since all of chemicals used to refine, acidulate and neutralize together with the undesirable constituents of crude oil, gums etc., are found in concentrated form in the acid water, examination of acid water will show it to be high in BOD, soluble salts and phosphorus. The soluble salts are primarily sodium sulfate and sodium phosphate. The sodium comes from the refining base (NaOH) and the acid water neutralizer (NaOH); the sulfate from the acidulating acid ($H_2SO_4$); the phosphorus from naturally occurring phosphatides (gums), which are hydrolyzed during acidulation into phosphate, and pretreat or process additions of phosphoric acid. Plant protein and carbohydrate fragments together with glycerol and residual oil produce the high BOD levels.

Enactment of environmental legislation has caused the disposition of soapstock and, in particular, acid water to become an increasingly difficult and costly problem. Not only is acid water highly acidic, it is high in b.o.d. and phosphorus. Several localities have strict effluent standards which force refiners to ship soapstock to an area with more liberal regulation where it can be acidulated.

In 1982 a privately funded research program was initiated to attempt to discover novel treatment processes for a large volume industrial waste product, the disposal of which had gained the attention of the Environmental Protection Agency (E.P.A.).

Phosphorus, the main component of the industrial waste, was creating a pollution problem which gained national and international attention—the eutrophication of a valuable natural resource, rivers and lakes. The E.P.A. focused on the problem and many plants/businesses were forced to close for non-compliance with the Federal Water pollution Control Act (Clean Water Act) of 1972 and amendments of 1977 and 1981.

Additional emphasis was placed on the waterways of the Great Lakes Basin area of the U.S. and Canada. *The Great Lakes Water Quality Agreement of* 1978 was signed and the *International Joint Commission* was established by the United States and Canada. The new Agreement reinforces the importance of controlling phosphorus pollution. The importance of this continuing effort to enforce stricter standards is of special concern, since the Great Lakes region has one of the highest densities of industries that generate the waste product in the world.

At present, there is no treatment technology available to industry that will meet proposed E.P.A. standards.

According to a recent statement by W. R. Grace Company:

"In an effort to address the environmental concerns that this industry faces, W. R. Grace is pioneering a new refining technology-Modified Caustic Refining (MCR). MCR utilizes TriSyl's ability to adsorb significant quantities of phophatides and soap, thereby eliminating the need for the water wash centrifuge step. Elimination of this unit operation results in lower wastewater treatment cost, and improved adsorbent utilization."

This demonstrates the importance of environmental concerns that the vegetable oil industry is facing.

W. R. Grace is promoting a method that reduces the remaining soap and phosphatides from once refined oil that previously was removed by a water wash, which shows that the industry struggles to find a cost efficient technology or method, or am technology, that prevents or minimizes the residual amounts of soap and phosphatides from the environment.

A recent issue of *Water Pollution Control Facilitates* magazine further indicates the general doctrine of water pollution control: that the so-called "nutrients" (nutrients apparently relate to the extent that the component causes undesirable plant growth in waste water streams) is an undesirable nuisance which must be removed from the waste water stream using sophisticated separation techniques. This feeling in the pollution control art probably derives from the fact that the fundamental doctrine of those now working in the waste water field is that waste water is something that is supposed to be ejected from the system. This narrow-minded doctrine probably derives from the inbred historical paranoia in western civilization concerning waste water.

Nutrient Industry

The horticulture industry and hydroponic-growing represent one of the fastest growing areas of the agricultural market. In 1980 the USDA Crop-Reporting Board showed that foliage production was up 11% from 1979. In 1981 the USDA reported a 7% increase in the wholesale value of all sales of floriculture crops to $1,020,000,000.

As the horticulture market expands, so does the demand for high-grade fertilizer. The potential for continuing the growth is indeed impressive. A comparison of the American and European consumer buying habits shows that Europeans buy 10.1 fresh flowers and plants per capita against only 1.9 in the United States. The differential is strikingly similar to the american-European wine consumption pattern that existed only 10–15 years ago. As the horticulture industry becomes more mass-merchandise oriented and steps up its promotional efforts to take advantage of the potentials, the demand for fresh flowers and plants will be enormous.

The greenhouse-grown plant industry represents the technological leading edge of agricultural science and business. Computers select which crops should be grown and control water and nutrient flows. Genetically-engineered seeds and plants are grown without soil in artificial atmospheres, fed with chemical solutions and covered with thermal blankets. The result is predictable-quality, higher yields, shortened growing times and maximized profitability.

The industry is continually striving to reduce costs and quickly implements new techniques and products that increase efficiency. It is interesting to note that in such a scientifically dynamic and eager market, no new technology or product for the chemical feed of greenhouse crops has been introduced in many years. All major fertilizer companies make virtually the same non-innovative 25-pound bags of dry, granulated fertilizer.

Since the professional grower employs sophisticated water and fertilization equipment, he requires specialized premium-quality fertilizers. The most important property of premium fertilizer is that it dissolve completely in water and that the resultant solution is particle-free. The purpose of these seemingly simple but extremely important requirements is that the grower prepares a concentrate nutrient solution to be added to precise amounts to the watering system. This is done by means of a proportioner which injects enough fertilizer to make 100–400 parts per million dilution.

Not only is the proportioning meter sensitive, but the delivery system employs hypodermic syringe-like tubes which are easily clogged by insoluble matter. Clogging subsequently requires costly and time-consuming cleaning. The grower cannot afford to jeopardize his crops to equipment downtime and accordingly pay a premium for high-quality products (i.e., high solubility and, therefore, high availability of nutrients to the plant).

BRIEF SUMMARY OF THE INVENTION

In general, the process of the invention utilizes the waste products of agricultural oil refining to create fertilizers for sale to agronomic and horticultural markets. The process views acid water as a resource recovery opportunity rather than a waste disposal problem. By employing "nutrient" chemicals, waste products which reduce margins become by-products that generate revenues and profits. The process is cost effective, utilizes standard equipment, permits compliance with the strictest effluent regulations, permits fatty acids to be recovered for full value on site, soapstock to be acidulated on-site rather than sold to acidulators below market values, offers the most ecologically desirable approach to managing process waste and presents the opportunity to refiners to employ the first closed-loop agricultural process system.

The simplest example of this philosophy is to replace sodium hydroxide with ammonia for the neutralization of acid water. Not only is there a substantial savings in chemical costs realize but, importantly, the compounds formed—ammonium sulfates and ammonium phosphates—are salable fertilizers. The acid water can be so treated as to retain residual growth hormone from the vegetables, residual pesticides, surfactants and other ingredients which enhance its fertilizing capabilities.

Fertilizers for sale to the premium horticultural market can be produced by making additional changes. Substituting potassium hydroxide for sodium hydroxide in the refining step; acidulating the potassium soapstock with a combination of sulfuric and phosphoric acids in a prescribed manner; and then neutralizing the acid water with ammonia or potassium hydroxide will produce a multinutrient fertilizer containing N̲, P̲, K̲ and S̲ as well as desirable trace element micronutrients.

In either case the production of fertilizers for sale is both more cost effective and ecologically desirable than the disposition of a waste product.

Soapstock does not have to be treated with any $H_3PO_4$ to make fertilizer. The $H_3PO_4$ can be added after the soapstock is acidulated with $H_2SO_4$ or not at all. There is $PO_4$-3 (from naturally occurring gums) already in the acid $H_2O$ and if additional $PO_4$-3 needs to be supplemented, it can be done with $H_3PO_4$ (which, unless otherwise indicated, needs to subsequently neutralized with base). Or the acid water, before or after neutralization, can be supplemented with phosphate by addition of phosphate compound, salt, like MAP, DAP-MONO or di-ammonium phosphate.

The way to "best" make fertilizer from the oil refining process may then be to:

1. Refine crude oil with potassium base (KOH), (other K salts may potentially be used).
2. Acidulate potassium soapstock with sulfuric acid ($H_2SO_4$).
3. Separate acid water form acid oil. At this point, the acid water contains; N (from gums) in a small %
   $P_2O_5$-(from phosphatides)
   K (from soapstock refinate)
   S (from $H_2SO_4$ acidulation)
4. The acid water can be neutralized with a nitrogen base if desired (makes the best economic sense) like ammonia $NH_3$, aqua ($NH_4OH$) or with KOH if a specialty product is to be made (horticultural fertilizer).

Supplemental N or P can be added via MAP/DAP- or $NH_4NO_3$— urea or not at all. If urea is used, better stability can be achieved by adding it later in the neutralization step.

The acid water from the potassium soapstock, acidulated with $H_2SO_4$, and neutralized with $NH_3$, can be used as is (as a liquid) or concentrated by evaporation (still as a liquid); or concentrated far enough to cause crystallization of salts and continuously removing them.

Depending upon the phosphatide content of the crude oil (non-degummed oils are preferred) and the chemicals and techniques used in refining, the concentration of salts in the "neutralized acid water" is approximately 20%.

Since it is desirable to produce a high analysis product, the dilute fertilizer solution should be concentrated. This can be accomplished by evaporation of water by natural or mechanical means, or by addition of material to upgrade the analysis.

If market demand require that a slurry or solid product be produced, crystallization techniques can be employed to make a variety of products.

Examination of the neutralized acid water will show a solution of multinutrient fertilizer: nitrogen from hydrolyzed phosphatides and ammonia; phosphorus ($P_2O_5$) from gums and phosphoric acid process additions; potassium ($K_2O$) from the refining caustic; and sulfur (as sulfate) from the sulfuric acid acidulation. In addition, naturally occurring trace elements from the oilseed are present in free or chelated form.

Virtually everything present in this solution is beneficial to plant growth as, in fact, it is derived from plant seed material. This process can be considered to be a true closed-loop agricultural process system. What the plant removes from the soil is concentrated in the seed, removed during oil refining and replaced into the soil for the next crop cycle.

The fertilizer solution can be used as a liquid or crystallized to a solid.

Several crystal forms are possible, but the predominant salt is a potassium, ammonium—phosphate, sulfate.

Many process variables are possible in order to tailor the final fertilizer preparation. One unique approach is to acidulate the potassium soapstock with sulfuric acid to a first pH below 7 and then complete the acidulation with phosphoric acid. By performing the acidulation in this manner all the phosphate added is found in the water phase, where it is wanted, without expensive losses in the oil phase. This procedure permits the relative percentages of sulfur and phosphorus to be varied considerably.

In another aspect of the invention, it may be preferable to use $Ca(OH)_2$ as a nutrient neutralizer of acid water to produce calcium phosphate for use as a feed supplement to animals (i.e., an animal fertilizer).

It may be preferable to refine crude oil with $Ca(OH)_2$ in order to have the Ca in the acid water.

Another aspect of the invention is the simple replacement of conventional sodium hydroxide with potassium hydroxide as the refining caustic. In the process of exploring the technical aspects of replacing the normal sodium hydroxide with potassium hydroxide in the process of caustic refining of crude agricultural oil, a number of important benefits have been discovered.

1. Less wash water.

One of the significant environmental deficiencies of conventional sodium hydroxide refining is that the refined oil which exits the centrifuge or separator must be processed through a number of water wash unit operations in order to remove any water soluble components from the refined oil. These water wash steps, in which water is mixed into the oil and then separated from the oil, produce a waste water stream with extremely low levels of water soluble components. It has been found that the refined oil product of potassium hydroxide refining can be brought to a given level of purity of water soluble components using less volume of water than would be true of the product of sodium hydroxide refining. This lower volume of waste water for a given level of oil purity reduces the waste water disposal problems both in terms of cost and environmental impact. In a refinery with a fixed number of wash stations, less volume of water can be used in each wash station. Conversely, in a new refinery design to take advantage of this aspect of potassium hydroxide refining, fewer wash stations and the commensurate savings and equipment cost, could be realized.

2. Higher clarity of oil.

It has been found that the oil which is the product of the potassium hydroxide refining process has a higher degree of clarity than oil produced using sodium hydroxide refining. Because the clarity is a major factor in the consumer acceptance of the refined oil, and therefore significantly impacts on the value of the oil product, this clarity feature, though primarily cosmetic, does significantly add to the value of the product.

3. More oil recovered.

It has been found that the use of potassium hydroxide in the refining process causes the recovery of a larger amount of refined oil from a given amount of crude oil. Thus, the productivity of the refining process, based on a given amount of crude oil input is increased and therefore the economics of the refining process is improved.

4. Reduced oil loss.

It has been found that the use of potassium hydroxide in the cost refining process reduces the amount of oil which is contained in the centrifuge or separator waste stream known as soapstock. Since the volume of soapstock generated by the refining of a given amount of crude oil is essentially considered a waste product having low value (or in fact frequently a net deposal cost), the ability to reduce the volume of soapstock by reducing the amount of oil contained in it is a significant economic and environmental benefit to the choice of potassium hydroxide as the refining caustic.

5. More interlayer removed.

One of the complicating components of the caustic refining process is the so-called interlayer or gum. This interlayer primarily consists of complex organic molecules including phosphorites. The amount of this interlayer which is formed in the potassium hydroxide version of caustic refining is significantly less than the amount that would be formed using sodium hydroxide refining. Because this interlayer component creates significant purification problems generally referred to as "degumming" and because the amount of the interlayer tends to reduce the amount and purity of the desired refined oil, the fact that the amount of interlayer formed in potassium hydroxide refining is less not only improves the economics of the refining process but also simplifies the process and the disposal problems caused by it.

6. Increased soap in soapstock.

Because the use of potassium hydroxide in the caustic refining step appears to allow a more effective separation of the refined oil from the soapstock, there appears to be a greater amount of soap that actually ends up in the soapstock stream. Because the values of the soap itself can be much more readily realized when it is part of the soapstock stream, as opposed to representing trace impurities in the refined oil stream, this improved separation improves the economics of the overall process.

7. Potassium soapstock is less viscous.

The soapstock which is produced by the use of potassium hydroxide in the caustic refining process, has been found to be significantly less viscous, at a given concentration, then the soapstock produced using sodium hydroxide refining. This reduced viscosity of the potassium soapstock makes the potassium soapstock very significantly easier to handle and transport between the refining process operation and the acidulation process operation. This ease of handling would be a benefit to the process even if the refining-acidulation processing were integrated. In fact, however, the industry has developed in such a way that the refining activities and the acidulation activities are normally conducted significant distances apart. As a result, it is normally necessary to load the soapstock into railroad tank cars, tank trucks, or barges in order to move the soapstock from the refinery to the acidulation facility. The ease of handling the less viscous potassium soapstock is of significant benefit in simplifying and reducing the cost of this transport operation.

BRIEF DESCRIPTION OF THE DRAWINGS

Specific embodiments of the invention are shown in the drawings, wherein.

DETAILED DESCRIPTION OF THE INVENTION

Basic Version

Figure 1:
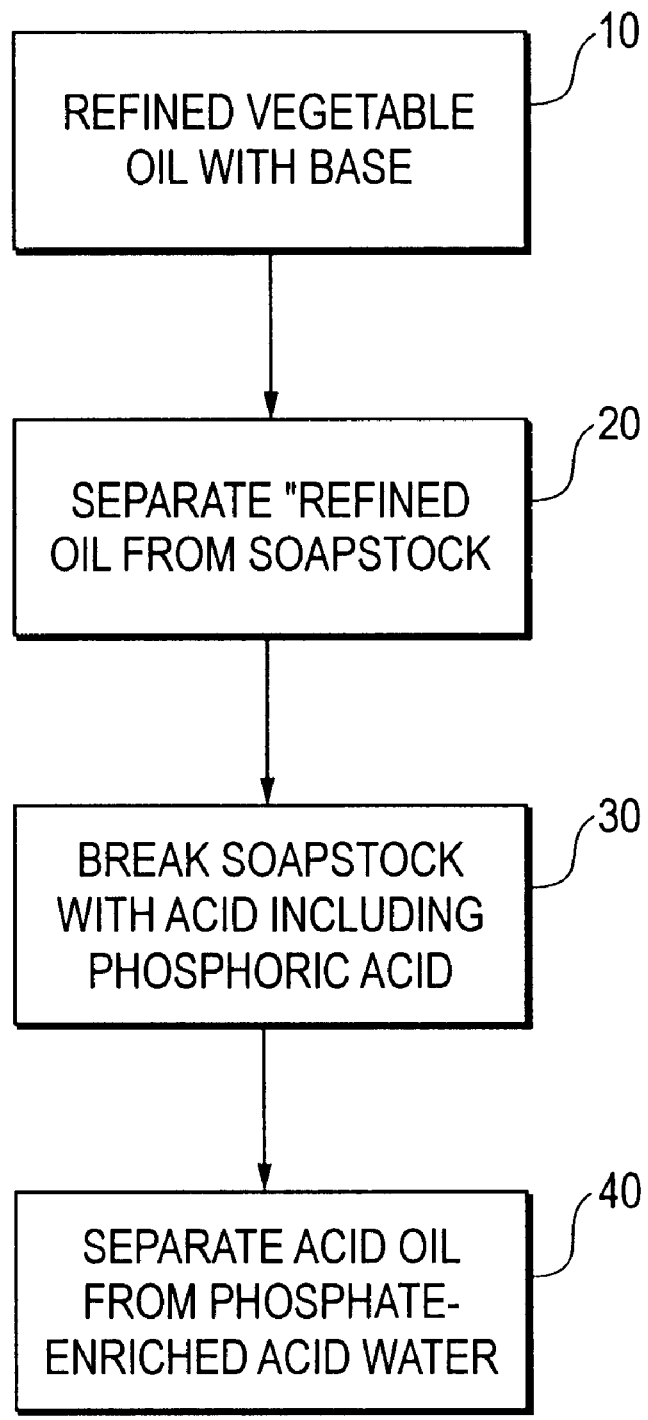
FIG. 1 is a flow diagram of an embodiment of the process.
Figure 2:
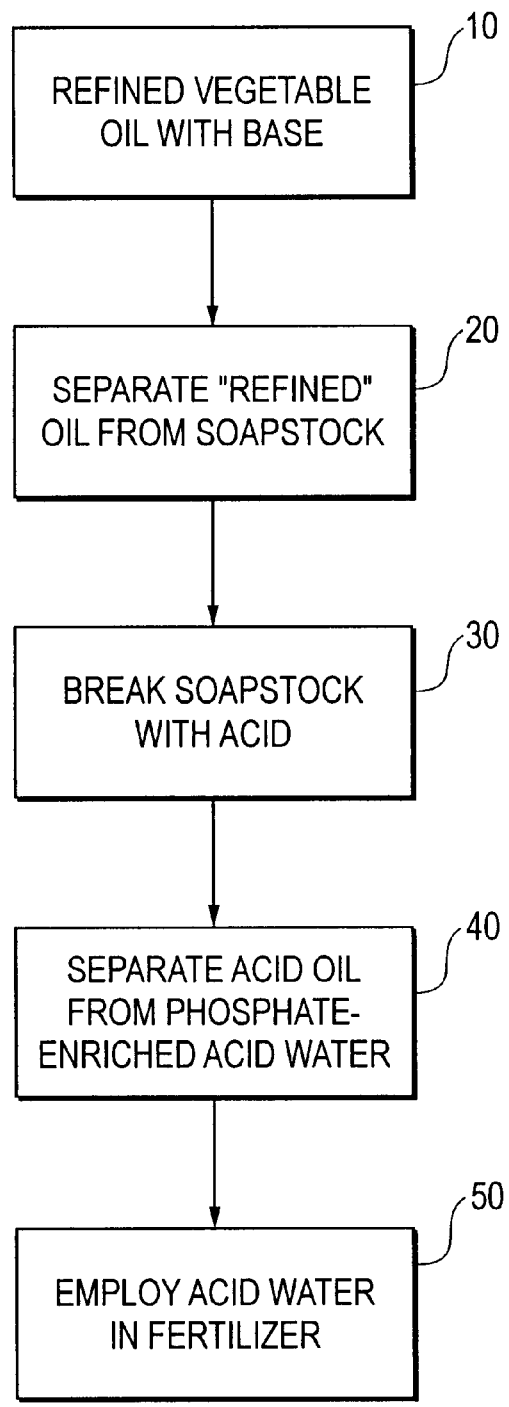
FIG. 2 shows a variant of the process.
Figure 3:
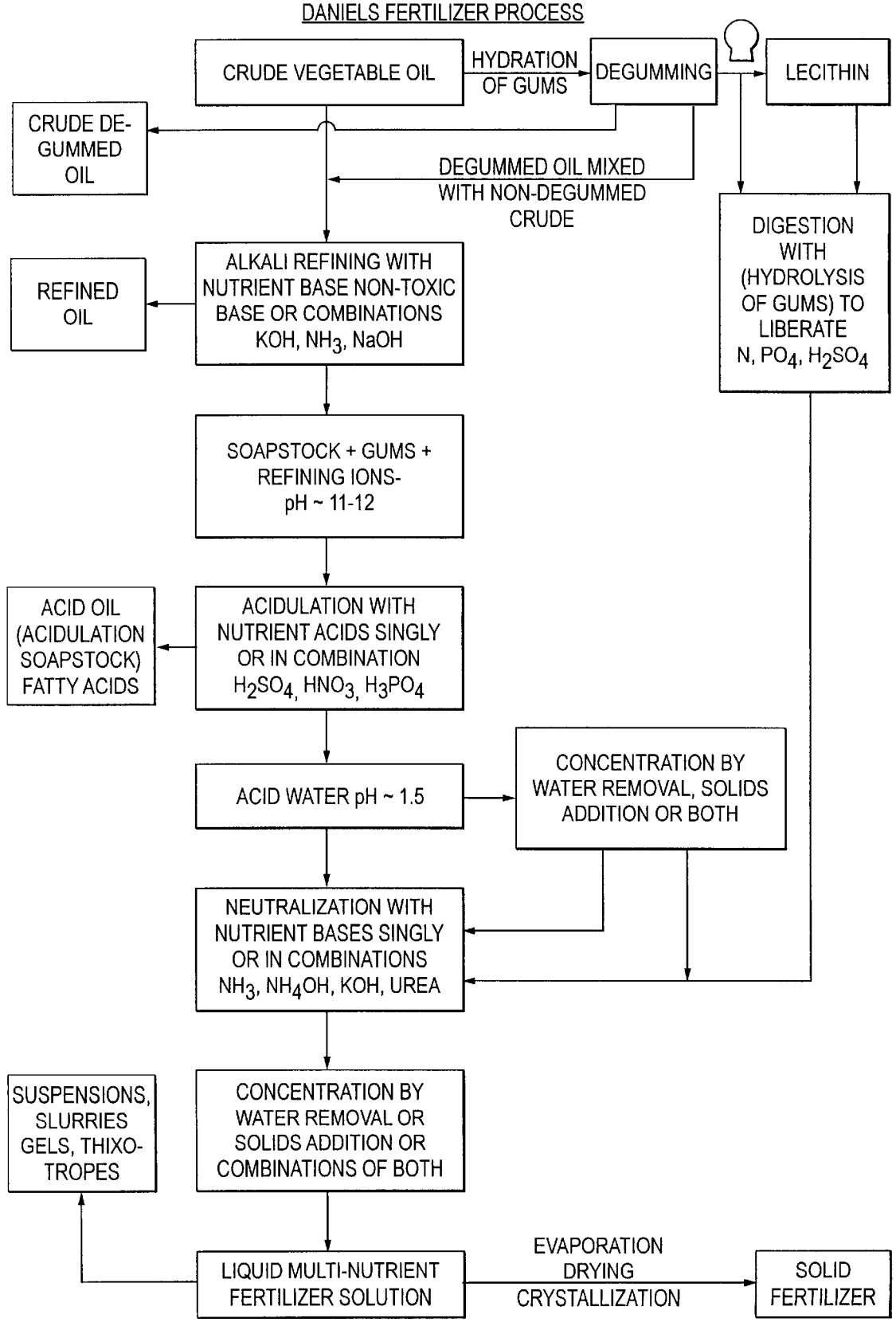
FIG. 3 illustrates a number of variants in one flow diagram.
Figure 4:
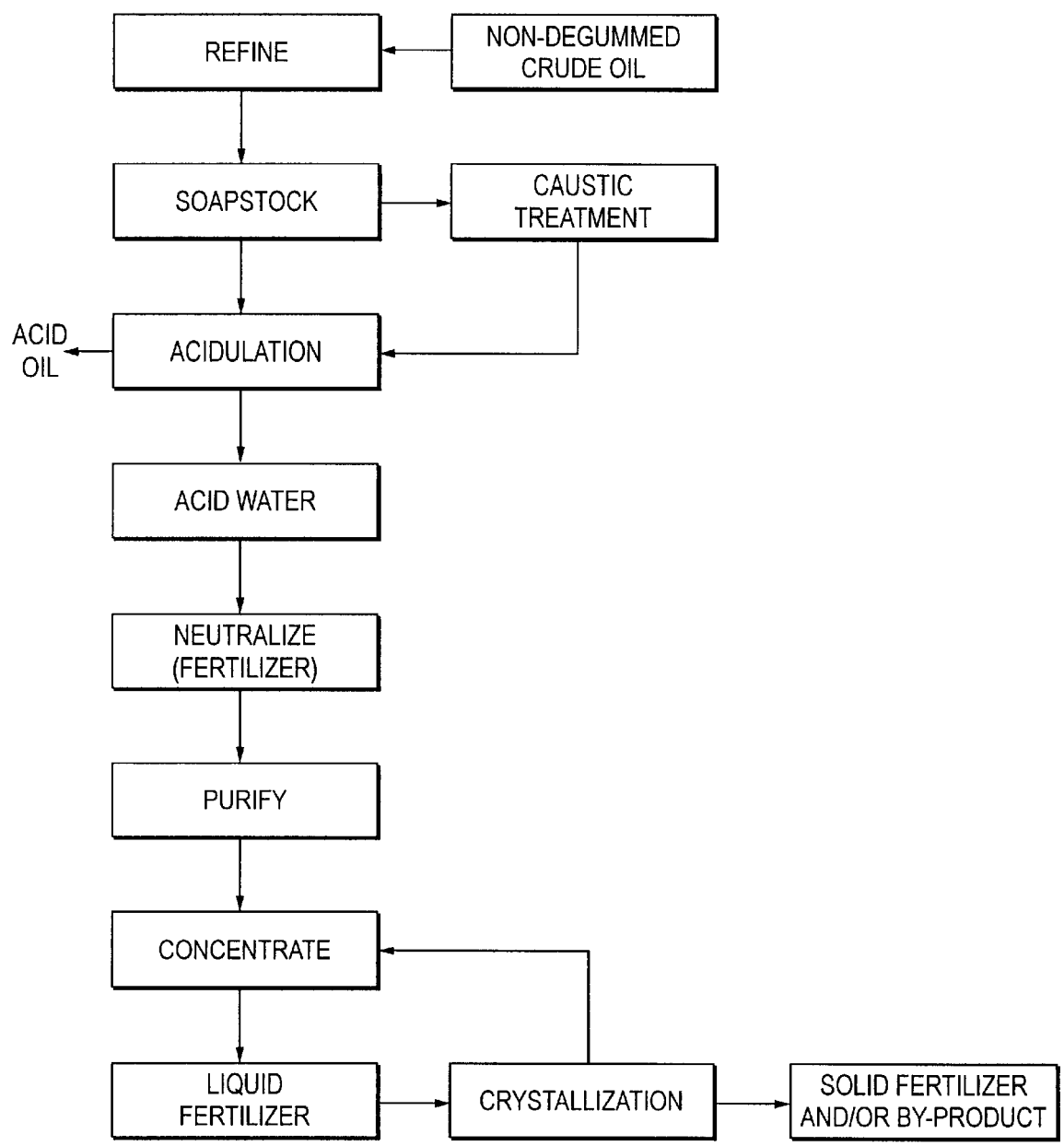
FIG. 4 is a general illustration of the process.
Figure 5:
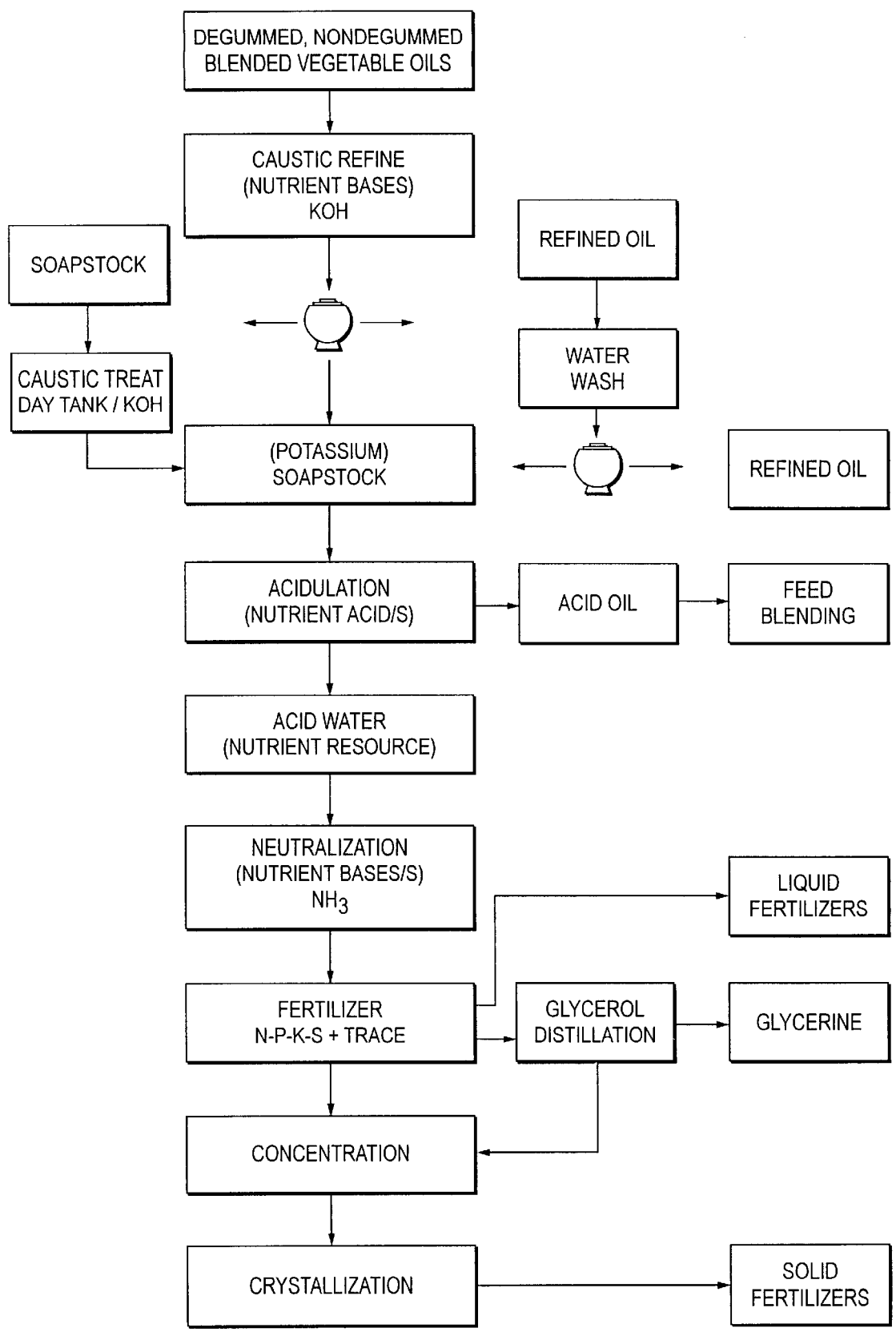
FIG. 5 illustrates another variant.
Figure 6:
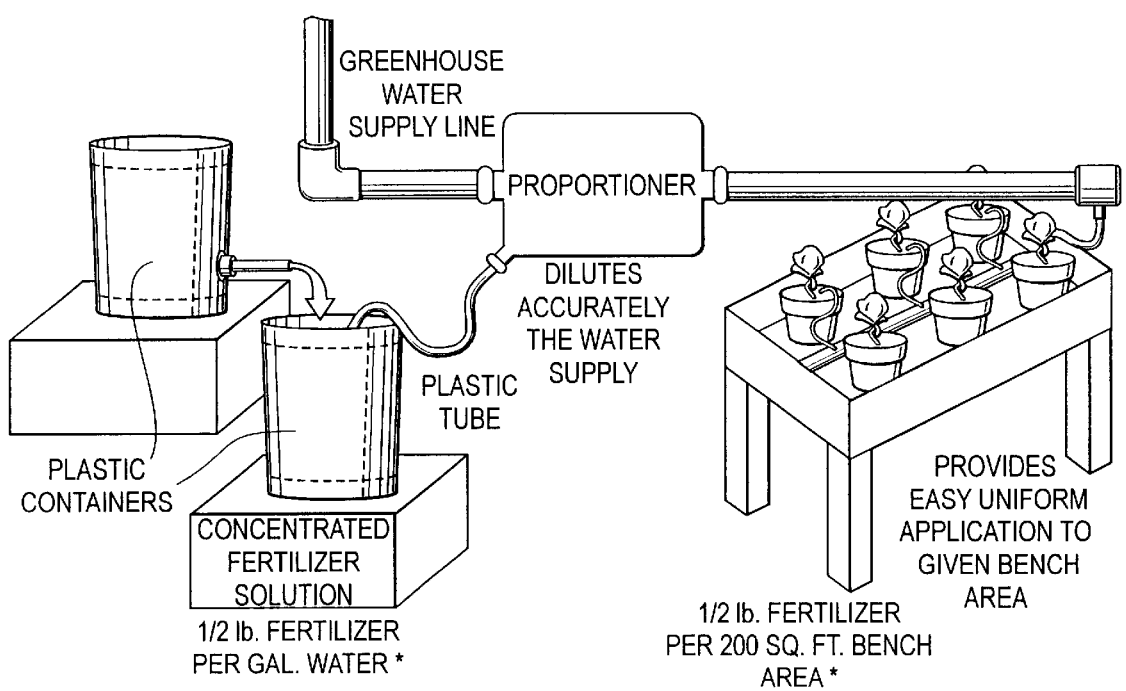
FIG. 6 shows a particular application of the resulting product in a horticultural setting.
Figure 7:
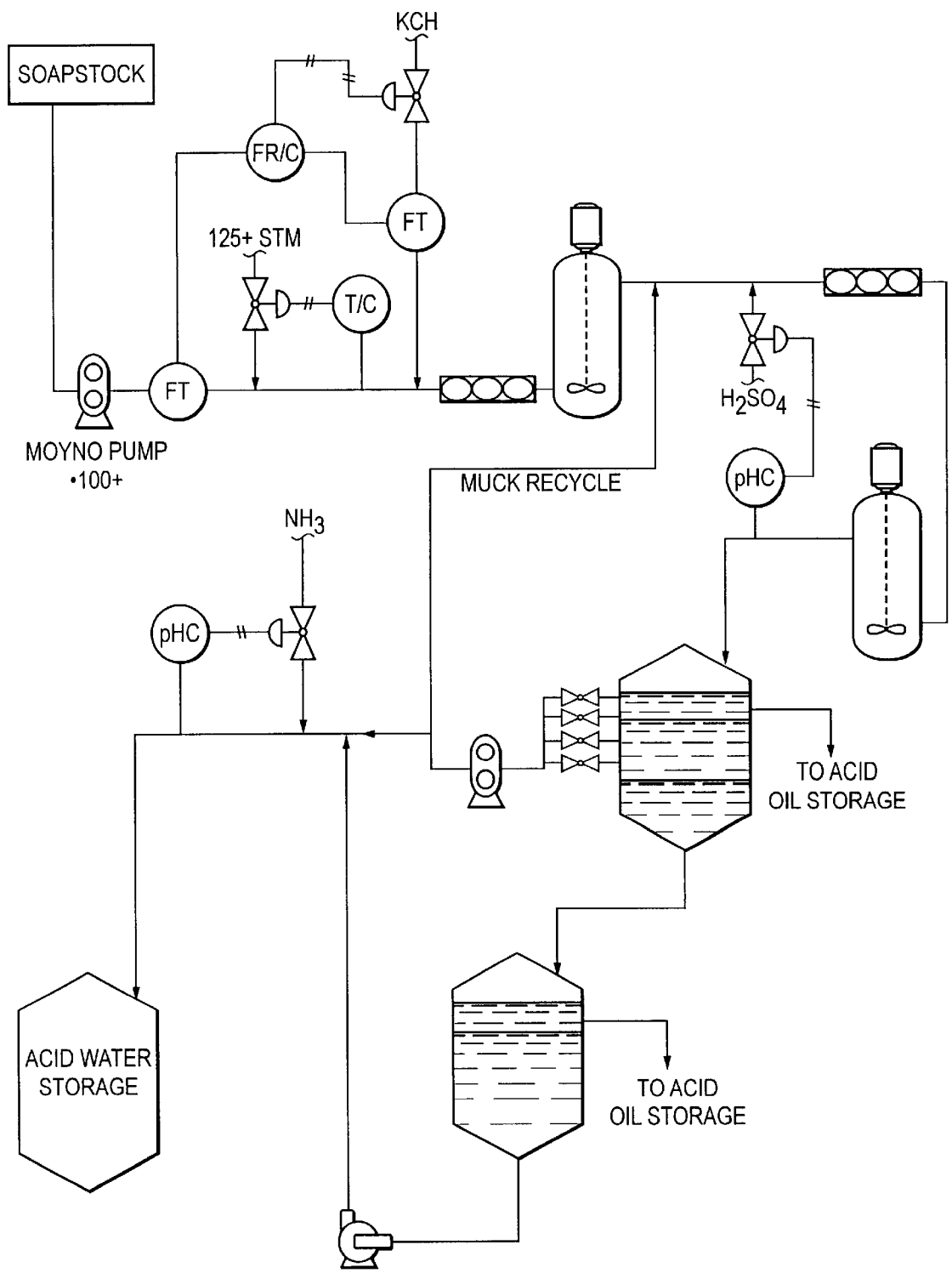
FIG. 7 is a flow sheet of an example of a continuous acidulation process.

In 1982 a feasibility study was conducted to determine if better utilization of soapstock (higher value for the fatty acids in the acid oil) could be realized. The study was promising enough to warrant further development, and formally commenced in August 1983.

The initial goals for the development program were to produce a higher grade of fatty acid from the soapstock for use in an industrial soap solution and capturing the alkali stream used in the above for conversion to tri-sodium phosphate. However, after some marketing studies were done, it was decided that it made more sense to make and market a liquid fertilizer concentrate from the aqueous phase of the acidulated soapstock rather than use the water for a TSP solution.

The first fertilizer product to be made was a 20-20-20 formulation (NPK-nitrogen, phosphorus, potassium) as a concentrate that was equivalent to dissolving 4 pounds of dry commercial 20-20-20 in water to make 1 gallon. Laboratory tests supposedly demonstrated that there was no problem maintaining a stable solution at below freezing temperatures. However, at the time when the product was to be made in production and shipped in 25 gallon drum, a solubility problem arose. Crystallization was occurring at room temperature due simply to oversaturation. Since this problem was physical, there was no practical solution.

The direction I took was a "back-to-basics" look at acidulating soapstock. Because of cost, sulfuric acid is used to split soapstock into acid oil and acid water. However, if fertilizer is the final objective, perhaps phosphoric acid can be used to acidulate—its 5 times higher cost justified by capturing all the phosphate in the water, thus providing the P in the standard NKP formulation. This had been tried once before and rejected when the water was analyzed for phosphate and only traces were found. However, the approach taken was to maintain the integrity of the fatty acid and, accordingly, acidulation was done only to pH 7. My initial experiments were designed to acidulate the soapstock to pH 6, 5, 4, 3, 2, and 1.5 and then analyze both the acid oil and the acid water for phosphate. If this proved commercially feasible, I would then refine crude soybean oil with potassium hydroxide rather than the industry standard use of sodium hydroxide (NaOH is cheaper than KOH) and analyze for potassium in the water. I would then make a decision on the commercial use of KOH based on the amount captured in the water and thus providing the K component of the NPK formulation.

The results of the phosphoric acid acidulations showed that too much phosphate was tied up in the acid oil to warrant use economically. However, the observation that most interested me was that the amount of phosphate in the acid oil was essentially constant and the additional acid used to reduce the pH was accordingly found in the water as increasing concentration of phosphate. The percentage of phosphate in the oil ranged from 2.3 to 3.0 on a weight-weight basis. Based on this result, I hypothesized using sulfuric acid first to acidulate to a given pH and then using phosphoric acid to reduce the pH to 1.5. The above acidulation experiments were repeated but sulfuric acid was used to bring the pH to 6 and then phosphoric acid used to reduce pH 1.5; sulfuric acid to pH 5 then phosphoric acid to pH 1.5 and so on. These results proved even more interesting.

The analysis of the acid oil for phosphate and acid water for phosphate and sulfate showed that the amount of phosphate in the oil again remained constant, but it was only present in greatly reduced amounts, 0.57% to 0.82% on a weight-weight basis. As would be expected, the respectively increasingly amount of sulfuric acid found its way into the water as increased percentages of sulfate, and the phosphoric acid as decreased amounts of phosphates. However, with such a small amount of phosphate trapped in the oil, the process was commercially feasible since the bulk was dissolved in water. It had the commercial advantage of using less sulfuric acid to acidulate and an almost complete capture of phosphate—a commercial advantage in making fertilizer.

As if that were not enough, the most important discovery was made in reviewing the results quantitatively to cross check the exact amounts used against the exact amounts found. What I discovered was that in every case there was more phosphate in the water than was used in the acidulation with phosphoric acid. At first I questioned the laboratory methods and results. I then analyzed the soapstock before acidulation for phosphate. This provided the answer. The soapstock contained phosphorus bearing compounds that were removed from the crude soybean oil during the refining process (gums, etc.) that together with the phosphoric acid added in minute amounts to the crude oil (500 ppm) to facilitate gum removal were released into the acid water during the acidulation process. This discovery greatly enhances the economics of the liquid fertilizer since phosphate is the most expensive component of the NPK formulation. 1–2% phosphate was found in the soapstock and a comparable amount was found in the acid oil and water. This is a significant amount in the at a 1 pound per gallon concentration of dry commercial 20-20-20 fertilizer in water is approximately 1.9% by weight.

This discovery suggested analysis of the acid water in conventional soapstock processing (with sulfuric acid) to determine if the phosphate is present. Analysis of the acid water from conventional soybean processing indicated the presence of sufficient phosphate to justify use of the acid water as a fertilizer after reducing the acidity, especially with a nutrient-type base such as urea or ammonium hydroxide.

After realizing the commercial significance of the phosphate discovery, it logically followed to analyze the acid water for nitrogen. It was found to be present at 0.16% which, although a small by itself, does represent 8–10% of the organic nitrogen requirement in the heretofore mentioned 1 pound per gallon of 20-20-20.

Therefore, the significance of these experiments, conclusion and discoveries is the practical and commercial use of a waste product that, otherwise, requires chemicals and equipment to treat, is a pollution control problem, and costs money to throw away.

The fertilizer, depending upon the final formulation (i.e., the ingredients added and their respective concentrations), has wide use for most agricultural crops. In addition, when properly formulated and packaged has special advantage in the greenhouse grown plant industry. This industry requires a higher quality fertilizer for specific application. Presently, the grower is dissolving solid granular fertilizer in a concentration of 1 pound per gallon of water and using this concentrate to feed the daily watering with a precise quantity of nutrients. There are several disadvantages inherent in using dry fertilizers in this way. First the fertilizer must be mixed until it is completely dissolved (this takes time and is inconvenient), secondly and most important, the watering systems used in the greenhouse have become very precise and employ tubes and fittings of very small diameters, hypodermic syringe like. They tend to get clogged up with insoluble present in greater or lesser degree with all solid fertilizers. A liquid based fertilizer not only eliminates the above problems, but also contains less "fill" or superfluous ingredients that tend to compromise the integrity of the growing medium. Most of the "fill" is water.

The product to be manufactured is a supersaturated solution using acid water as the starting vehicle, and adding sufficient Nitrogen and urea and/or ammonium nitrate; Phosphoric acid; Potassium hydroxide for K and other micronutrients as salts or chelates (Sulfur is present in varying degrees upon how much is used/required when acidulation is done) to proper concentrations to make a desired final product, i.e., 20-20-20, 5-10-30, etc.

The supersaturated solutions will be formulated at a concentration equivalent to 5 pounds per gallon at a temperature of approximately 100 degrees F. (the ingredients are soluble at this temperature) and packaged in 5 gallon containers (bag in box). The 5 gallon containers will contain the equivalent of 25 pounds of dry fertilizer: the industry uses 25 pound bags. When the temperature drops, the solution will crystalize out as expected. However, this does not pose a problem anymore. This grower need only pour the "slurry" into a container and add water to make 25 or 50 gallons as he currently does with one or two 25 pound bags to 25 to 50 gallons of water. The crystals dissolve almost instantly. Thus producing a concentration of 1 pound per gallon with no time needed for mixing and no suspended particles.

One of the best ways to produce the product initially would be to refine the crude oil with potassium hydroxide; acidulate the potassium soapstock with sulfuric acid to pH 7 and below (depending upon how much sulfate is required) and finish the acidulation with phosphoric acid to pH 1.5. The product would then be analyzed for NPK and nutrient would be added to a desired final formulation.

Variant Process

A fertilizer was manufactured as follows:
a. Sodium soapstock (crude oil refined with NaOH) was acidulated with $H_2SO_4$ to approximately pH 3 and phosphoric acid added to approximately pH 2. The acid oil was separated from acid water.
b. The acid water containing Na, $SO_4$, $PO_4$, plus some nitrogen and trace amounts of micronutrients—Cu, Fe, Mg, etc. was used to make a liquid fertilizer as follows:
 1. $H_3PO_4$ added to the aqueous mixture sufficient to make final $P_2O_5$ concentrate (15–20%). This keeps the solution acidic throughout the entire process so that N is not lost as $NH_3$.
 2. Ammonium Nitrate was dissolved in the solution. This salt adds Nitrogen in the ammonium form and nitrate form. Since urea is also added, the amounts of each can be varied to produce the desired ratio of Ammonium Nitrate-Urea to supplement the N already in solution from natural sources. Solution temperature drops (negative heat of solution). Urea is added after the solution is neutralized (approx. pH 6.5) and the solution is hot.
 3. The solution was neutralized with KOH (solid dissolved in $H_2O$) in solution. The amount of KOH needed to neutralize the acid was "coincidentally" the mount necessary for the desired end concentration (15–10%) $K_2O$ equivalent. Solution gets very hot. $NH_3$ is liberated if KOH is added to quickly.
4. Urea was then added to bring the concentration of N to the desired 15–20% equivalent.

c. The fertilizer (a 20-20-20 equivalent in liquid concentrate form) was fed to plants—tomatoes, pot mums, etc.—in 100, 200, 400 ppm Nitrogen concentrations using a fertilizer propertioner and dribble tubes to each plant. The plants were grown in a greenhouse under conditions set by the Ball Seed Co. The same number of plants were fertilized with "Peters™" 20-20-20 stock solution of fertilizer prepared from solid fertilizer dissolved in water. The plants were grown in a soilless medium. The crops were grown from seedlings to maturity and compared for differences, examined for problems during the crop cycle and evaluated for a number of criteria. Overall, the Peter formulation was judged superior in "growing efficiency", however, the product from the present process was not that far behind.

The important observation to note is that the fertilizer of the invention was formulated for this test with acid water produced from refining oil with sodium hydroxide (NaOH) and, therefore, this formulation had a substantial amount of Na+ present. Also present was a substantial amount of Cl. Both of these came from the NaOH used in refining crude oil. Since these are extraneous ions, they will retard the efficiency of a chemical fertilizer fed to plants in a soilless media—raises salt index, etc. If a rayon-grade NaOH is used (lower Cl present), the Cl— can be brought down to tolerable levels and, therefore, should improve the efficiency of the fertilizer or if the best formulation is produced, using KOH to refine (also low Cl— grade) then there are no undesirable ions/salts in the preparation and accordingly the fertilizer will perform better in a growing test-comparison. On the other hand, some crops such as sugar beets, tolerate NaCl in fertilizer. In such cases this variant may have special applicability.

Additionally, it is important to note is that plants grown traditionally in soil have a substantially greater tolerance to "impurities" in fertilizers i.e., "fertilizer grade" —because of the soil medium. Accordingly a fertilizer prepared for agronomic use could be prepared from a acid water that was a result of refining with NaOH without the loss in efficiency that was observed (predictably) with the plants grown "hydroponically". The K component could be added at a later time—as is often done by fertilizer cold blend plants (they buy nitrogen solutions and/or mix with MAP/DAP and then add K as muriate of potassium) just before application to a crop. Mixtures of NaOH and KOH could be used to maximize efficiency with cost in the refining step or KOH can also be added to the soapstock "day tank" (NaOH is presently used because of cost) to saponify the crude oil lost in the refining process that becomes part of the soapstock ("entrained oil" is the term used). NaOH used presently before acidulating to make sure all the oil is saponified before acidulation so that the amount of interphase (emulsion) is minimized. If K is used it has use as a fertilizer component. Here again KOH and NaOH could be blended.

Because the plants grown in the above described experiment, performed better than would be expected with a chemical feed having a relatively high concentration of sodium and chloride—there is evidence that something in the acid water or in the specific formulation method improves the efficiency of the feed.

Since some residual soap is present in the acid water, this can have a beneficial surface tension lowering effect that allows improved nutrient uptake by the plant. The glycerol (glycerine) present may also provide this adjuvant action. (Note: in a waste acid water stream glycerol is a high BOD component. In a fertilizer by-product stream it is beneficial). Also there may be some residual growth hormones that were not destroyed by alkali or acid. At any rate, acid water seems to have a beneficial-supplemental-synergistic effect on plant growth when utilized as a fertilizer. Further analysis and tests are expected to identify the exact mechanism of action.

Another fertilizer was prepared as follows:
a. Na soapstock was acidulated with $H_2SO_4$ solely.
b. Acid oil and acid water were separated.
c. The acid water was neutralized with $NH_4OH$.
d. The solution was concentrated by crude evaporation, i.e., heating on hot plate to ¼–⅕ original volume.
e. Upon cooling, 2 crystals formed, samples of each were taken.
f. The solution with crystals was redissolved by addition of water and evaporated to dryness crudely in an oven.
g. The final solid mass was analyzed, as were the 2 crystals ampled earlier.

The initial conclusions to be drawn from the experiments are:
1. 2-distinct crystals form from the concentrated solution of different chemical evaporation.
2. This can be a method to manufacture solid crystals (fertilizer solids) or crystals for use in other commercial processes.
3. The method can be used to "purify" the fertilizer solution, since Na and $SO_4$ are the predominant elements crystallizing out. It is a means to concentrate the $P_2O_5$ component in the solution since a small amount of Potassium in crystallized out.
4. This can be a method to manufacture a complex salt with the 4 primary fertilizer materials present: K-N-P-S by starting with a crude oil refined with potassium.
5. This is a method to manufacture fertilizer using sodium hydroxide to refine crude oil and to produce a complex salt/s that can be used in commerce as will as the improved liquid balance remaining in the solution, as a fertilizer solution higher in potassium concentration and lower in Na and $SO_4$, although desirable, has the lowest dollar value as a nutrient.
6. There is a beneficial effect in solubility of N-P-K-s, that is, "$Na_2SO_4$ is salted out-crystallized".

Nitric acid should be considered as an acidulating, or adjuvant acid as it is a practical way to formulate a fertilizer high in nitrate nitrogen. Also, since calcium nitrate is presently used as a plant food on poinsettias, $Ca(OH)_2$ can be useful neutralizer, provided that sulfates are not present as calcium sulfate (gypsum) precipitates out. It is also obviously possible to reduce the sulfate concentration in a fertilizer mixture by addition of Ca, if that is desired.

It may be preferable to use $Ca(OH)_2$ as a nutrient neutralizer of acid water to produce calcium phosphate for use as a feed supplement to animals.

It may also be preferable to refine crude oil with $Ca(OH)_2$ in order to have the to Ca in the acid water, especially if the end use, as an animal fertilizer.

The end products may be used as animal feed supplements (animal fertilizer). There is evidence that soapstock from potassium-base refining makes a better poultry feed.

The glycerol int he fertilizer apparently has no deleterious effect on plant growth and, in fact, may prove to be beneficial adjuvant. It may, however, be problematic in manufacturing a solid product from the liquid feed stream.

Depending on the evaporator-crystallizer equipment, the solid end product can include the glycerol in the lattice for it should/can be removed. In the latter case the sweet water glycerol may be a by-product of the process.

It may be preferable and economical to put a distillation column on the evaporator and take the glycerin off in the vapor phase.

Ammonium Phosphate (di-ammonium phosphate-DAP) not only is a major plant fertilizer material, but is sold as feed grade DAP for animal feed supplements, for 50% more in price.

Experimental Results

Soapstock Acidulations

Soya soapstocks were acidulated with (A) phosphoric acid, and (B) a combination of sulfuric and phosphoric acids. The resultant acid oils and acid waters were analyzed for phosphate.

The results show that if phosphoric acid is used alone a relatively high percentage of phosphate (approximately 2.7%) is found in the oil, the balance substantially in the water. However, if sulfuric acid is used to first break the soap and phosphoric acid added to complete the acidulation, then only a minimal amount (0.7%) of phosphate is found in the oil. The acid water contains the bulk of the available phosphate, where it is wanted.

Note the additional philosophical difference where phosphates are now desirable in acid water. This process prefers the use of high phosphatidic oils that are non-degummed prior to refining. This discovery not only permits great flexibility in the varying of sulfate—phosphate percentages in the final product, but maximizes the recovery of soluble phosphate which is the most expensive component of mixed nutrient fertilizers.

Below is a tabulation of the phosphate analyses referred to above.

Acidulation Analyses

| A. Acidulations using Phosphoric Acid alone | | | | |
|---|---|---|---|---|
| pH | % $PO_4$ oil | % $PO_4$ water | Gms %100 $H_3PO_4$ used | Gms 100% $H_3PO_4$ in oil | Gms 100% $H_3PO_4$ in water |
| 6 | 2.36 | 2.73 | 3.20 | 0.74 | 4.90 |
| 5 | 2.76 | 4.11 | 6.5 | 0.87 | 7.50 |
| 4 | 2.86 | 5.40 | 10.00 | 0.90 | 9.80 |
| 3 | 2.35 | 5.99 | 11.20 | 0.74 | 10.80 |
| 2 | 2.93 | 6.59 | 13.20 | 0.92 | 11.90 |
| 1.5 | 3.04 | 8.43 | 16.30 | 0.96 | 15.30 |

| B. Acidulations using Sulfuric Acid to pH Values at Left, and Phosphoric Acid to pH 1.5 | | | | |
|---|---|---|---|---|
| pH | % $PO_4$ oil | % $PO_4$ water | % $SO_4$ water | Gms 100% $H_3PO_4$ used | Gms 100% $H_3PO_4$ in water |
| 6 | 0.69 | 6.60 | 1.90 | 11.90 | 11.90 |
| 5 | 0.66 | 5.60 | 2.90 | 10.20 | 10.20 |
| 4 | 0.82 | 4.90 | 3.40 | 6.50 | 8.90 |
| 3 | 2.00 | 3.80 | 2.70 | 4.70 | 6.90 |
| 2 | 0.57 | 2.00 | 3.50 | 2.80 | 3.60 |

Material Balance and Cost Estimates

A. Refining with KOH

Potassium hydroxide will react in the same mole ratio as Sodium Hydroxide:

NaOH+RCOOH=RCOONa+$H_2O$ Mol. wgt. NaOH=40

KOH+RCOOHH=RCOOK+$H_2O$ Mol. wgt. KOH=56

If mole. wgt. KOH is divided by mol. wgt. NaOH, ratio=1.4, therefore, 1.4 times weight) KOH is required to refine the same quantity of NaOH is used. Also NaOH costs approximately $35/ton and KOH costs approximately $570/ton.

In a 30,000 lb/hr refining operation, using the equation below, this amounts to:

$$\text{wgt. \% lye} = \frac{(\% \, FFA \times 0.142 + \% \, \text{excess lye}) \times 100}{\% \, \text{NaOH or KOH in lye}}$$

11,000 lbs NaOH per 24 hour day 15,500 lbs KOH per 24 hour day

This change results in an approximate loss of $250.00 per day for a 30,000 lb/day refinery operating 24 hours a day. This analysis should be used as a guide. Actual usage and cost figure should be employed when making comparisons.

B. Neutralization of Acid Water with Ammonia

Ammonia will react with sulfuric acid and phosphoric acid in the same mole ration as sodium hydroxide. (Simplified equations).

$2NH_3 + H_2SO_4 = (NH_4)_2SO_4 + H_2O$ $2NaOH + H_2SO_4 = (Na)_2SO_4 + H_2O$ mol. wgt. NaOH = 40 mol. wgt. $NH_3$ = 17

$3NH_3 + H_3PO_4 = (NH_4)_3PO_4 + H_2O$ $3NaOH + H_3PO_4 = (Na)_3PO_4 + H_2O$

If the mol. wgt. of NaOH is divided by the mol. wgt. $NH_3$ the ratio is approximately 0.25. Therefore, it takes only ¼ the weight of $NH_3$ to neutralize an equivalent amount of acid water containing sulfuric and phosphoric acids when compared to neutralizing with NaOH. Also ammonia costs approximately $180/ton vs NaOH cost of approximately $350/ton.

This change results in an 87% reduction in the cost of neutralization. Again actual cost and usage figures should be used as the basis of a comparison.

Crystallization Experiments

I. Soapstocks created from the refining of soy-bean oil with caustic soda (NaOH) were acidulated with sulfuric acid and the acid oil separated from the acid water.

The acid water (pH approximately 2.0) was neutralized with ammonium hydroxide.

The solution was concentrated by evaporating water unit 20–25% of the original volume remained. The supersaturated solution was allowed to cool to room temperature and is for several days.

Upon observation, three (3) phases were present; a brown, sticky mass comprised the bulk of the material. This semi-crystalline-solid material was undoubtedly degraded from the excess heat used to evaporate the water. Also present were two (2) crystal phases: A. the first crystals were tiny, granular and light brown in color. B. the other crystals were large, elongated and white.

Upon analysis of the three materials, the results showed:

| 1. Brown Mass | N 7.20% |
| --- | --- |
| | P as P 3.40% as $P_2O_5$ 7.80% |
| | Na 8.10% |
| | S as $SO_4$ 6.75% |
| 2. Small Brown Crystals | N 5.30% |
| | P 1.14% |
| | Na 8.99% |
| | $SO_4$ 9.37% |
| 3. Large White Crystals | N 5.30% |
| | P 0.45% |
| | Na 8.90% |
| | $SO_4$ 9.37% |

II.

Sodium soapstock were created as above and acidulated. The acid water ($H_2SO_4$ used) and acid oil were separated. The acid water was used as a starting material to make horticultural fertilizer.

To the acid water was added sufficient phosphoric acid to supplement the naturally occurring phosphate from phosphotides to bring the final analysis to approximately 17% $P_2O_5$. Supplemental N was added first as ammonium nitrate. The solution was now neutralized with potassium hydroxide and allowed to cool to about 100–125° F.

The remainder of the N was added as urea. The solution was allowed to sit for several days and then observed in the bottom of the vessel. These were analyzed and the results are as follows:

| 1. Large White Crystals: | |
| --- | --- |
| N as nitrate N | 15% |
| N as ammonium N | .5% |
| P as $P_2O_5$ | 1.65% |
| K as $K_2O$ | 44.85% |
| Na | .12% |
| Cl | .08% |
| S as $SO_4$ | 12% |

These crystals are predominantly potassium nitrate with some ammonium phosphate and trace amounts of Na, $SO_4$ and Cl.

All of the materials produced from experiments I and II can be used as fertilizer materials as is. In case II, potassium nitrate is a premium fertilizer material and commands a high price. This is an unexpected result in that Potassium Sulfate is less soluble and would be expected to crystallize first. These processes can be used to either produce the crystals for sale as solid fertilizers, or used to adjust the concentration of ions in the solution phase (liquid fertilizer).

We compared a liquid fertilizer made by the process of the invention to Peters 20-20-20, an industry standard. We looked at pot mums and bedding plants as tested crops.

The bedding plant group included petunias, impatiens, marigolds, and tomatoes. Pot mums variety yellow mandalay grown 5 cuttings per 6 inch pot.

Fertilizer rates of 100, 200, and 400 ppm N was selected as a constant feed.

Observations

Bedding Plants: Very few differences were observed between the groups because greenhouse temperature were too warm during the summer resulting in stretched plants. The best visually rated was the Peters 20-20-20 ppm N. This is based on color and growth.

Pot Mums: The top rated plants were Peters 20-20-20 @ 200 ppm N, and Daniels @ 400 ppm N. The 100 ppm rates were shorter with smaller diameters. The 100 ppm Daniels was the smallest plant. Some lower leave yellowing was noticed on the Daniels 100 ppm N rate showing up about the 4th week and remained throughout the test.

The 200 ppm Daniels was 2 inches shorter than Peters 200 ppm N. Both the 400 ppm rates showed an excess of nitrogen with stiff brittle foliage.

Root systems were visually different with the 100 ppm Daniels showing the most white roots around the soil ball.

Overall crop timing was comparable with approximately 5 days between the first open group and the last open group. The 100 ppm Daniels was the last group to open with the 400 ppm Daniels, 400 ppm Peters, and 200 ppm Peters bring the first groups.

The physical handling and mixing of the liquid fertilizer was easier than the dry Peters. It is easier to measure the liquid and blend the concentrate solution. Mold growth was observed on the stock experimental solution but was not noticed on the dilute solutions.

Overall, the liquid fertilizer is easier to handle, but the comparative growth was less with the liquid fertilizer.

Results are available from soil and foliar samples taken from roses grown in Massachusetts and fertilized by a product according to the present invention.

The data shows that the nutrient intake is better than one might expect from any fertilizer that is presently commercially available. The basis of this observation is the comparison of soil nutrients and foliar nutrients. The analyses show that given a constant feeding program the nutrients in the soil are lower over time and the same nutrients in the leaf are higher over time, indicating that the elements are being strongly assimilated by the plant mechanism. This is a preferred situation since it means that the fertilizer of the invention gets more nutrients where they belong in a given feeding program; this means a strong, healthier and more productive plant. Or, stated another way, the grower could actually use less fertilizer to obtain the desired level of nutrients in the plant for peak performance.

Also another significant observation is that plants grown with the fertilizer of the invention are (from visual observation) at least as good, if not better, than plants grown with the commercial mix. This is significant in that commercial mix is formulated with almost all nitrate nitrogen, the form that the plant assimilates it. Nitrate nitrogen is recommended for greenhouse plants grown during periods of low light and colder temperatures, i.e., Fall and Winter months in the northerly climates. The fertilizer made by the invention was, in this case, 75% ammonium and urea nitrogen, and only 255 nitrate nitrogen. The former two are considered dangerous to use during the winter as they may not be converted to the nitrate form and can build up in the soil/medium and cause a toxic condition. At any rate, nitrates are preferred over urea and ammonium since they perform better in the Fall/Winter.

The fertilizer of the invention performs visually at least as well as the more expensive commercial fertilizer, and better from a nutrient foliar analyses—which is much more meaningful, particularly over the long term.

The testing was performed by two highly respected rose growers on different varieties of roses from September through Valentines Day harvesting. The roses were fed on a constant feed basis (a fertilizer injector was used) for 5 months without interruption at the same level of nutrient as the roses fed in normal fashion with their regular fertilizer.

Neither grower knew that the fertilizer they were testing had anything to do with soybean oil refining "waste". They only understood that they were to test a new liquid fertilizer under their field growing conditions and compare the results with plants grown with their regular fertilizer.

Montgomery Rose Company, Hadley, Mass. is the largest rose grower in the Northeast. Southwick Greenhouse, Southwick, Mass., is a leading-edge grower employing state-of-the-art, computer-controlled growing techniques.

The data indicates that:
1. Nutritional levels of major, minor and trace elements in the plant were as high or higher than the regular fertilizer. This indicates excellent solubility or availability of all elements to the plant. It is important to note that the test plants were fed only the fertilizer of the invention for 5 months. The other plants were fed with several fertilizers as the chemical compatibility of the many nutrients are such that insoluble precipitates are formed.
2 No adverse reactions were found in either the plants tested for the soil as a result of the new fertilizer. This shows that the fertilizer is both safe for use as well as efficacious.
3. Plants fed with the fertilizer of the invention produced crops with higher yields and quality than plants fed with regular fertilizer. Southwick reported the same number of roses produced, but the Daniels plants had a higher proportion of longer stems than the regular plants. It is interesting to note that Southwick spent 4 years developing their fertilizer blend and program. The experimental product produced better results the first time. Montgomery reported that they got a 10 percent greater crop yield than their regular fertilizer produced and they considered 4 blooms per plant to be "extraordinary". Since all conditions were the same and the only variable was the fertilizer used, it can be concluded that the fertilizer of the invention was superior in that it produced a greater crop with more valuable (i.e., longer stem) units.
4. It should also be noted that the makeup of nitrogen in the Daniels fertilizer was approximately 20 percent nitrate and 40 percent each of ammonium and urea nitrogen. The fertilizer used regularly by both Montgomery and Southwick is primarily nitrate nitrogen during the Fall and Winter growing months of low light and cold temperatures. The overall results of the experimental fertilizer are even more impressive given that the nitrogen sources were less than optimum. This can be indicative of a adjuvant effect of the aqueous carrier (acid water) that improves nutrient absorption.
5. Because of the excess chelate in the product, growers noticed that little or no sludge was formed in the bottom of their makeup tank. Their regular fertilizers cause a substantial insoluble precipitate to be found as a result of impurities in the mix or hardness in the water. Since insoluble can clog fertilizer/watering lines, the fertilizer of the invention offers a distinct advantage.
6. The fertilizer of the invention being a liquid, needed only to be mixed with water to produce a "stock solution". Conventional solid fertilizers need to be dissolved in hot water (a negative heat of solution is inherent in these products) and then allowed to settle out and then decanted to minimize insoluble. An hour or more is spent in this operation. The fertilizer of the invention requires no time to mix and has no insoluble.

All soil and foliar analyses were preformed by a reputable consulting laboratory.

Description of Test

Fertilizer prepared as a by product os soybean oil refining was supplied to growers as a 5 gallon, 50 pound unit of 7.5–10–8 liquid (equivalent to a 25 lb bag of dry mix 15-20-16).

The growers had no idea of the basis of manufacture of the fertilizer. They were only aware of a new liquid fertilizer in pre-production tests made by the Daniels Fertilizer Company.

They agreed to use the new fertilizer in actual growing conditions and to compare results with plants grown with their regular feed. Test areas in the greenhouse were selected so that conditions would be representative of typical conditions. Both the test beds and the rest of the plants were fed the same level of nutrient based on ppm of nitrogen. The plants were fed on a constant feed basis using a fertilizer proportioner with the watering system.

Fall-Winter testing was conducted on high grade roses by two growers: Southwick Greenhouse, Southwick, Mass. and Montgomery Rose Company of Hadley, Mass. Both growers are considered highly professional leaders of their industry with Southwick a smaller, highly controlled grower and Montgomery the largest rose grower in the Northeast (285,000 plants).

Foliar and soil analyses were performed on samples from both locations in October, November, December, January and February for Major, Secondary and Minor elements. Both the test beds and regular beds in the greenhouses were sampled and compared for differences.

Crop counts and grades were conducted when the roses were harvested on Valentine's Day.

A report of soil and foliar analyses findings is included by the laboratory conducting the tests and a questionnaire completed by the grower involved with the test is provided.

Additional tests are in progress in New York, New Jersey and Connecticut on Spring crops such as mums. Results will become available in May.

Samples were taken at both locations from October through January which is about one full cycle of rose production. Soil and foliar samples were taken from rose beds fed with Daniels (fertilizer of the invention) and equivalent rose beds fed with the normal fertilizer in use at the particular greenhouse range. The amounts of fertilizer used per feeding were adjust so that the test fertilizer and the normal fertilizer were fed in about the same quantities per nutrient content.

Both the soil test reports and the foliar analysis report will offer valuable results and conclusions. It is important here not to compare one range with the other since many differences exist between them, like, for instance, differences in soil, pH, watering practices, greenhouse management and other cultural practices.

The soil tests done by the Chemical Consulting of Babylon are of a type that tests for pH, soluble salts, and such nutrients as nitrates, ammonium nitrogen, phosphate, potassium, calcium, magnesium, iron and manganese. All test results indicate the amount of the elements readily available to the plants at the time the soil is sampled.

Generally, good conditions and fertility for roses are:

| Test | Good Range |
| --- | --- |
| pH | 5.8–6.5 |
| Soluble Salts | 20–60 mhos |
| Nitrate Nitrogen | 20–60 ppm |
| Ammonium Nitrogen | 0.5–5 ppm |
| Phosphate | 10–25 ppm |
| Potassium | 10–40 ppm |
| Calcium | 150–220 ppm |
| Magnesium | 10–30 ppm |
| Iron | 0.5–2 ppm |
| Manganese | 0.5–2 ppm |

Despite the different conditions existing in the two testing locations, the soil tests indicate generally adequate fertility levels even when pH conditions are below the ranges that are considered best for roses. The fertilizer of the invention maintained pH and fertility levels at the same or better levels than the areas it is compared to.

It must again be kept in mind that the application rate of the fertilizers for the test beds and the regular beds are adjusted to be equal in strength to provide nutrition to the roses.

The soil test is quite accurate especially when used steadily over a long period of time and it will become a very clear indicator of what is going on in the soil. It also must be understood, like in all general testing, a fluctuation in results of about plus or minus 5% is normal.

Foliar analysis was carried out on the same locations where soil tests were taken. Foliar analysis is much more involved, but also a much better predictor and indicator of nutritional conditions in the plants.

The foliar analysis is done for all the elements listed below with the standard ranges for roses given as well. Values below the standard ranges are considered to be deficient.

| Test Element | Standard Range |
| --- | --- |
| Nitrogen | 2.8–5.0% |
| Phosphorous | 0.20–0.30% |
| Potassium | 1.80–3.0% |
| Calcium | 1.0–2.0% |
| Magnesium | 0.20–0.35% |
| Aluminum | 50:350 ppm (ppm = parts per million) |
| Boron | 30–60 ppm |
| Copper | 5–15 ppm |
| Iron | 50–250 ppm |
| Manganese | 30–250 ppm |
| Zinc | 15–50 ppm |
| Molybdenum | 5–15 ppm |
| Sodium | 5–15 ppm |

The evaluation of the foliar analysis results dating from October 1987 to January 1988 indicate very steady levels of all nutrients in the standard range. In comparing the results to beds with normal fertilizers used in the range, it can be pointed out that levels with the experimental fertilizer showed up well. Especially the trace element levels remained well above the lower range of the standard conditions and often were higher than found in samples from other areas. It is important here to indicate that the levels were maintained at a time when stresses in roses are common because of artificial lighting. This stress is often indicated by a drop in the trace element levels and can become deficient.

Poor leaf size and off-colored leaves, as well as leaf drop, were not found at the Southwick or the North Hadley test sites. Leaves were generally fully developed with a dark green and healthy color.

Foliar samples were taken at the North Hadley location from November, 1987 through January, of 1988. This allowed again to observe the nutritional status of roses from a complete cycle under different conditions and a different location. No artificial lighting is in use in North Hadley. The results indicate that the test beds showed excellent nutritional conditions and compared well again to the areas fed with regular fertilizers. They did as well or better and even some increases can be seen in the element levels. The best can be seen in the manganese levels which steadily went up.

The color and leaf size was also excellent at North Hadley.

Conclusions

The conclusions that can be drawn from the test results are as follows:

(1) The fertilizers performed well in the results indicated by the soil tests and the foliar analysis.

(2) In some instances, it performed even better than the regular fertilize in use.

(3) Minor elements, because the complete liquid nature of the fertilizer, seem to be better distributed, which explains the increase in some minor element levels indicated in the foliar test results.

(4) No toxicity or adverse conditions indicated because of the nature of the fertilizer or its manufacturing.

(5) Fertilizer did not influence or change pH conditions during the time of testing. This will be an important factor in the merchandising of this product.

Industrial Applicability

The by-product created by the Daniels Process is a completely soluble multinutrient fertilizer for use on all major crops. The cost to industry to implement this environmentally desirable process is actually less than their current waste disposal practice. Nevertheless, industry is slow and reluctant to change. The Daniels Process is a closed loop, zero discharge system.

In 1986–87, more than 12 million metric tons of vegetable oils (10 million of which is soybean oil) will be refined in the United States. A waste product in phosphorus pollution alone, equivalent to 1,000,000 metric tons of phosphoric acid, will be created.

With appropriate standards and legislation, an alternative process could be encouraged with benefits to the environment, the public, whose tax dollars are spent processing an unnecessary waste load, and the nation's farmers who would welcome a low cost by-product fertilizer.

The refining of crude vegetable oils for edible use is concentrated in the midwest, west and southern agricultural sections of the U.S.—close to the source of oilseed crops such as soybeans, cottonseed, corn and sunflower. Given the fact that 2 billion bushels of soybeans, yielding 14.3 million tons oil for refining, a waste of significant proportion is generated.

Agricultural/Environmental Trends

Although fertilizer prices are severely depressed, the industry has begun a rebound. More importantly, several trends point to higher prices, greater wages and potential shortages by the end of the century. The macroeconomic trends in place strongly suggest increasing value of by-product fertilizers and the Daniels Process.

There are two trends that should have a favorable impact on the use and value of the invention(s):

(1) WORLD GROWTH The U.S. Census Bureau predicts that the world's population will grow from 4.6 to 8.0 billion people in the next 25 years. This should increase the demand for fertilizers employed to maximize crop yields.

Experts are predicting a "worldwide fertilizer crunch" by the year 2000 unless some 200 new worldscale plants are built and existing facilities refurbished. Dr. Guido P. Giusti, President of Texasgulf Inc. (Stamford, Conn.) estimated that $108 billion in capital would be required to avert the crisis. Dr. Earl Batz points out that less farm acreage will be available to feed more people.

Therefore, crop yields must be increased with high quality fertilizers.

(2) ENVIRONMENTAL PROTECTION AGENCY IMPACT As E.P.A. with public support continues to legislate and implement stricter air and water purity standards, the importance and potential value of technologies that permit compliance with the law should increase accordingly. A closed-loop, zero discharge system is in keeping with the waste minimization, by-product process trends being advocated.

The process of the invention allows an agricultural-environmental dual benefit to take place. A significant waste is eliminated and a product of use is created.

Statistics on sales of fertilizers to the horticulture and hydroponic markets are hard to come by. However, estimates place them at around $200 million, a relatively small segment of the multibillion-dollar total fertilizer market. With exciting growth possibilities immediately ahead for the floriculture business, prospects for the premium fertilizer market are equally promising. When this approaching growth phenomenon is coupled with a new technology to produce products that are superior in purity, more convenient to use, and lower in cost, then it is easy to understand the industrial applicability of the invention.

Products

The process of the invention is able to produce liquid blends of chemicals containing all necessary elements (major, minor and trace) to produce a complete, pH balanced plant food. Targeted for the professional horticulture market, the products are primarily packaged in five-gallon units. Each unit is designed with the grower in mind. The cube is equivalent to the competitions' 25-pound bag of dry fertilizer and simplifies the preparation of stock solutions. Also, the five-gallon unit is more efficient in space utilization which lower shipping costs and facilitates storage and handling. Bulk quantities will also be offered in 10,000-gallon tank trucks and rail cars. Pricing will vary depending upon raw material costs, quantities and discounts.

In addition to being easier to use, time-saving and space-efficient, the products are superior in purity to commercial preparations. As was stated earlier., a 20-20-20 blend of fertilizer represents 20% nitrogen, 20% phosphorous and 20% potassium. IN a 25-pound bag of "Peters", for example, this amounts to 15 pounds (60%) of usable nutrients. The remaining 40% is solid filler that may build up in the soil or growing medium with potentially harmful effects to crops. In the fertilizer of the invention's 20-20-20, the other 40% is essentially water.

These unique features offer impressive competitive advantages over existing products.

Potential Market

There are approximately 300 refineries through the world, 100 of which are in the U.S., that could potentially utilize this technology.

Estimated Cost

A unit of typical size would cost approximates $750,000.

Utility Usage

Approximately 120 kwh/day are consumed.

Further Discussion of KOH Refining

POS Pilot Plant Corp. was contracted to investigate the use of potassium hydroxide as the refining agent for oils processing. The intent is to prepare the potassium soapstock as a fertilizer for agricultural use. In order to convince the commercial processor to convert their refineries they require information in processing differences between the traditional sodium hydroxide refining and potassium hydroxide refining. It is for this purpose that POS has been contracted.

The major objective of this project was to determine if there are any processing differences between using potassium hydroxide and using the traditional sodium hydroxide as alkali refining agent. Three oils were to be subjected to experimental processing on bench scale; these were canola, soy and corn. The areas of focus were as follows:

To determine comparative losses between the two refining agents.

To determine differences in the soaps washing characteristics between the two refining agents.

To determine of there are any problems with further processing of the potassium hydroxide refined oil and subsequent deodorized oil quality.

Three oils were processed on the benchtop; these were superdegummed canola, water degummed soy and crude corn oil. Their processing was conducted using standard protocols for each of the oils excepting the KOH addition. The table shows the calculations used to determine the KOH addition levels required to keep the molar addition and water addition the same as for the NaOH refining.

All refining treatments were kept identical in oil weight, container used, stirring paddle used, and rpm's of the stirring to ensure identical treatment for comparison of results.

All centrifugations were done using a 1 L bucket centrifuge at 4800×g.

The following are a belief description of the function of each processing step:

Degumming

Degumming is the removal of phosphatides and mucilaginous materials from the oil. Phosphatides are reacted with either phosphoric or citric acid to make them hydratable. Centrifugation is then used for their removal.

Refining

Refining is the removal of free fatty acids. After saponification with caustic they become water soluble and can be removed by centrifugation.

Water Washing

Water washing is the removal of additional soaps residues from the refining step. The guideline for this step is for the soaps level to be less then 50 ppm prior to bleaching.

Bleaching

The refined oil is treated with an adsorptive clay for the removal of peroxides, phosphatides, color pigments and traces of soap.

Deodorized

The bleached oil is subjected to a steam treatment in order to remove odoriferous and flavor components, additional color pigments and additional free fatty acids.

The Analytical Methods used were:

| | |
|---|---|
| Peroxide Value (PV) | AOCS Cd 8-53 |
| Free Fatty Acids (FFA) | AOCS Ca 5a-40 |
| Phosphorous | Induced Coupled Plasma |
| Chlorophyll | 'Lovibond' Automatic Tintometer |
| Color | 'Lovibond' Automatic Tintometer |
| Neutral Oil (chromo. loss) | AOCS Ca 9f-57 |
| Soaps (as sodium Oleate) | AOCS Cc 17-79 |
| Neut. Oil in Soap Stock | AOCS G 5-40 |
| Rancimat | 'Metrohm' Rancimat: Induction time at 120° C. and 20 L/hr air |

Results and Discussion

Soaps

Soaps levels in the refined oils are lower in all cases then what would be expected in a commercial operation, depending on the oil they range from 300 to 600 ppm after the alkali treatment. The general guideline of 50 ppm or less prior to bleaching does not apply for this reason and it cannot be assumed that the washing step can be deleted by the commercial processor.

Comparison of the soaps analysis shows lower residual soaps for the KOH treatment both after refining and after water washing except for the corn oil water wash. It is not speculated that the washing step can be skipped (note above paragraph), however, washing characteristics are improved.

It should be noted that the soaps were all measured as sodium oleate and not corrected to be potassium oleate in the KOH refining trials. This would result in a 5% increase in ppm recorded (K Oleate=320.5 g/mol; Na Oleate 304.4 g/mol).

Refining Losses

Refining losses were the same or lower for the KOH treatment, however, measurement of neutral oil in the soapstock indicated higher losses for the KOH treatment. Within the accuracy of the test it would have to be said that little or no difference in losses was observed.

Commercial operations usually have a neutral oil content of 20 to 40%. The soapstock produced on the benchtop fell within this range.

It was observed that the NaOH refining produced a soap pellet after centrifugation which was both more tightly paced and less pourable. In performing the separations for analysis the interface layer (5 to 10 g between the oil and soapstock) was not included in either of the oil or the soapstock fractions. The efficiency of this separation may explain a higher refining loss not necessarily meaning a higher neutral oil in the soapstock.

Losses during the water washing step were comparable for the NaOH and KOH treated oils. Again these losses are considerably higher than those obtained commercially on continuous separation equipment.

Bleaching

Bleached oil qualities were typical except for the canola which had high peroxide and high chlorophyll content for the KOH refined oil. These high values can be attributed to an old starting oil. (The superdegummed oil obtained was almost two years old.) This was confirmed by bleaching of the NaOH refined canola oil which also resulted in higher than normal chlorophylls and peroxides. Clay levels used, 2.5%, were typical for benchtop bleaching of canola oil with this level of chlorophyll, ie. 22 ppm.

It should also be noted that peroxide values were measured on the day following the processing step which resulted in a typical rise in peroxide value from 0 to approx. 0.4 meq/kg.

Chlorophyll levels prior to deodorization should be less than 0.06 ppm. Higher values result in a lime green appearance to the deodorized oil.

It should be noted that the clay levels used are higher than those commercial processors use. This was done to ensure sufficient bleaching.

Deodorizing

The deodorization of the oils produced oils with specifications that are typical of a deodorized product. Peroxides, free fatty acids, color and oil stability, as measured by Rancimat, are typical. (Note: Rancimat values are ¼ to ⅙ of value obtained by traditional AOM procedure.) Only the canola with 0.4 ppm of chlorophyll as discussed under 'Bleaching' is off specification.

Conclusions

Benchtop work comparing KOH refining to the traditional NaOH refining showed no significant difference in neutral oil losses. The finished oil quality also falls within normal product specifications.

Water washing was as efficient if not more efficient for soaps removal, possible reductions in water wash levels may be possible.

Appendix: KOH Addition Calculations

KOH Concentration (equal water condition)

$$\frac{g\ KOH}{g\ KOH\ sol^n} = \frac{\frac{?\ g\ NaOH}{100\ g\ NaOH sol^n} \times \frac{56.1056\ g\ KOH/mol}{39.9971\ g\ NaOH/mol}}{\frac{(100-?)\ g\ H_2O}{110\ g\ NaOh\ sol^n} + \frac{?\ g\ NaOH}{100\ g\ NaOH\ sol^n} \times \frac{546.1056\ g\ KOH/mol}{39.9971\ g\ NaOH/mol}}$$

ie. 14 Be NaOH is 9.5% and ? = 9.5: KOH $sol^n$ = 12.83%

18 Be NaOH is 12.6% and ? = 12.68: KOH $sol^n$ = 16.92%

Addition Level (equimolar addition)

$$\frac{g\ KOH sol^n}{g\ Oil} = \frac{g\ NaOH\ sol^n}{g\ Oil} \times$$

$$\frac{?\ g\ NaOH}{100\ g\ NaOH\ sol^n} \times \frac{56.1056\ g\ KOH/mol}{39.9971\ g\ NaOH/mol} \times \frac{1}{\frac{??\ g\ KOH}{100\ g\ sol^n}}$$

ie. 12.83% KOH: ? = 9.5, ?? = 12.83: KOH $add^t$ is 1.0387×
g NaOH $sol^n$ /g 16.92% KOH: ? = 12.68, ?? = 16.92: KOH $add^t$ is 1.0512×
g NaOH $sol^n$ /g Oil

Addendum

Processors would calculate their addition level directly, based on the following formula:

$$\%\ Treat = \frac{(\%\ FFA)\ (factor) + \%\ excess}{\%\ caustic\ sol^n/100}$$

$$Factor = \frac{Mol.\ wt.\ caustic}{Mol.\ wt.\ oleic\ acid}$$

ie. for 12.83% KOH, % Treat=((% FFA) (56.1056/282)+% excess)/0.1283

Note: The % excess will be different for the NaOH and KOH by the ratio of their molecular weights.

Consequences for Fertilizer Production

For example, if the typical refining caustic, sodium hydroxide, is replaced by potassium hydroxide (caustic potash), potassium soaps and soapstocks result. Upon acidulation they yield potassium salts in the acidic water phase. When the acidic water phase is neutralized with ammonia ($NH_3$), a multinutrient fertilizer solution is created. Upon analysis the solution will be found to contain:

1. The three Primary Plant Nutrients: nitrogen, phosphorus, potassium.
2. The three Secondary Plant Nutrients: sulfur, calcium, magnesium.
3. Many trace element Micronutrients: copper, iron, zinc, manganese, etc.
4. Organic matter beneficial to soil and plant growth.

The sources of the above nutrients are:
1. Nitrogen from phosphatides and ammonia.
2. Phosphorus from phosphatides and $H_3PO_4$ pretreatment.
3. Potassium from the refining caustic, KOH.
4. Sulfur from the soapstock acidulant, $H_2SO_4$.
5. Calcium and magnesium from phosphatides.
6. Trace element micronutrients from crude oil. The mix and concentration are dependent upon the oil refined and its origin.

Summary of POS KOH Refining Study

The POS Pilot Plant Corp. of Saskatchewan, Canada was contracted to investigate potential differences between oils refined with potassium hydroxide (caustic potash) and those refined with sodium hydroxide (caustic soda), the traditional refining alkali.

Three oils, soybean, corn and canola were subjected to experimental processing on benchtop scale. It was to be determined if refining losses, soaps in oil and refined and deodorized oil quality differed between the KOH and NaOH refined oils.

The data indicates that refining losses were similar for both the KOH and NaOH refined oils. Finished oil quality was within normal product specification for the KOH refined oils. The major differences between the two caustic refining agents compared was found in the soaps analysis. The results show lower soap levels both before and after water washing for the KOH refined oils. While it is not speculated that washing may be eliminated, washing characteristics are improved.

Economic Analysis

Depending on the oil to be refined (FFA content), whether it is degummed or nondegummed (phosphatide content), whether and how much phosphoric acid is used to pretreat and the caustic strength employed, a typical 30,000 lb/hr refinery can reasonably expect the following:
1. An increase in both quantity used and cost to refine crude oils with KOH vs. NaOH. The cost differential is obtained by first calculating the amount of KOH needed. This can be done by multiplying the amount of NaOH presently used times the ratio of their molecular weights, KOH:NaOH.
2. A decrease in both quantity and cost to neutralize acid water with $NH_3$ vs. NaOH. As above, the quantity of $NH_3$ must be calculated by knowing the amount of NaOH used to neutralize and to multiply that amount by the ratio of their molecular weights, $NH_3$:NaOH.
3. The net difference for the above process changes should result in savings of approximately $450.00 per day.
4. One tank truck of fertilizer, approximately 20 tons per day, should be produced with an approximate analysis of 4-4-4-1. Depending upon market conditions, it is estimated that the fertilizer value is $400.00 per day.
5. Acid oil (AFA) can be recovered for full value on site.
6. Acid water disposal costs are eliminated.

Fertilizer Testing

Fertilizer made by the process of the present invention was tested on sensitive high value floriculture crops by leading independent professional growers located throughout the northeastern United States.

Crops were grown in soil and soilless (artificial) media with natural and artificial lighting. Testing was conducted on plants grown during the Fall and Winter months which, in this region of the country, is the period of lowest light, coldest temperature and maximum growing stress on the plant. It is an ideal time to test a new fertilizer. Worst case growing conditions exist during this period which will tend to accelerate observation of nutrient deficiencies.

The fertilizer of the invention was tested on plants selected in a contiguous area of the greenhouse representative of the most typical growing area. The testing experiments were designed to make the test fertilizer the only variable.

The remaining majority of plants in the green house were fed with the grower's regular feed as the control. Branded horticultural grade fertilizers (Peters™, Plantex™) and growers' own blended preparations, developed over many years, were used.

The test and control plants were fed with equivalent nutrient levels by means of separate proportioners which metered fertilizer into the watering stream. This technique is called "constant feeding" and has been shown to maximize crop response.

Sampling, growing media analyses and plant tissue (foliar) analyses were performed by Dr. Hans Helmprecht, a horticultural consultant and owner of the Chemical Consulting Company and Nutrient Testing Laboratories of Babylon, New York. Samples of the test and control plants were taken and analyzed monthly for the duration of the crop cycle (two cycles were checked for cut roses). Nitrate and ammonium forms of nitrogen in the growing media and in tissue were monitored as was the pH of the growing media.

The test fertilizer, a 7.5-10-6-1 liquid, was used for all testing conducted.

The results obtained from the foliar analyses indicate that plants fed with the test fertilizer has nutrient levels consistent with maximum response standards. Trace element levels which often drop precipitously during high stress, low light and cold periods remained constant or increased. This is consistent with peak metabolism. pH in the growing media remained stable.

Crop yields were calculated form the cut rose harvest. Results show a 15% increase in yield (blooms produced) from the plants fed with the fertilizer of the present invention.

Further Studies by Rickland Food Company, Stuttgart, Ark.

| ANALYSIS OF SOY OIL REFINED WITH POTASSIUM HYDROXIDE .14° KOH, ,15% EXCESS. | | |
|---|---|---|
| | SAMPLE TIME: | |
| OIL FROM #1 PRIMARY (SOAP) | OIL FROM #2 PRIMARY (SOAP) | OIL FROM WATER WASHER (FFA) |
| 3:00 PM | 324 | 324.021 |
| 3:30 PM | 300 | 300.021 |
| 4:00 PM | 312 | 300.020 |
| 4:30 PM | 312 | 300.022 |
| 5:00 PM | 300 | 300.020 |
| 5:30 PM | 312 | 312.019 |
| 6:00 PM | 324 | 312.019 |
| 6:30 PM | 324 | 276.021 |
| 7:00 PM | 252 | 300.023 |
| 7:30 PM | 228 | 276.021 |

-continued

| | | |
|---|---|---|
| 8:00 PM | 312 | 288.020 |
| 8:30 PM | 300 | 312.020 |
| 9:00 PM | 360 | 312.020 |
| 9:30 PM | 240 | 300.019 |
| 10:00 PM | 228 | 240.019 |
| FINISHED TANK 1315, BATCH #678, | FFA | .020 |
| | SOAP | 3 (PPM) |
| THERE WAS A NOTICBABLE CLARITY OF THE OIL FROM PRIMARY CENTRIFUGES. | | |
| TYPICAL NAOH REFINED OIL ANALYSIS: | | |
| SOAP FROM PRIMARIES | 320 +/− 30 PPM | |
| FFA FROM WATER WASHER | .020 +/− .002% | |

Further Testing by Liberty Vegetables Oil Co., Santa Fe Springs, Calif.

A test was made to compare refining crude corn oil with NaOH and KOH. Two refining feed tanks were filled with 50 m lbs. each of crude corn oil from the same railcar. This crude oil has an FFA of 2.1%.

The first 50 m was refined with 20° Be' NaOH with the following results:

1. Refined oil FFA-0.02%
2. Primary back pressure was 35 PSI
3. Spin was 0.06% on refined oil from primary
4. The soapstock has 13.0% neutral oil and 70.1% moisture
5. The bleached oil color was 34Y-4.3R The second 50 m was refined with 20° Be' KOH with the following results:

1. Refined oil FFA-0.02%
2. Primary back pressure was 20 PSI
3. Spin was 0.04% on refined oil from primary
4. The soapstock has 17.7% neutral oil and 66.7% moisture
5. The bleached oil color was 34Y-3.0R Comment from the refinery operator, was that KOH should be used on all the oils.

Bunge Foods KOH Refining Trial, Fort Worth

Below attached are the details and results of the potassium hydroxide refining studies conducted by Bunge Foods Research and Development. The results show that using KOH is a viable alternative to NaOH, and the next logical step is a cost analysis.

A refining test was conducted at the Bunge Foods Fort Worth facility to evaluate the use of potassium hydroxide as a refining agent. Crude oil with a known Neutral Oil and Loss (NOL) value was refined with both sodium and potassium hydroxides and samples were collected for in-process quality analyses and loss determination. The results from these analyses were compared and it was concluded that there is no appreciable difference in quality between sodium and potassium hydroxide refined oils.

A bench test was conducted by Bunge Foods Research and Development in December, 1992, to ensure that oil quality would not be compromised when KOH was used. The results of this bench scale test were favorable, and a plant scale trial was designed. This trial was conducted at the Fort Worth facility with the objectives of determining the efficacy of using KOH on a large scale and evaluating any changes in processing conditions and/or refined oil quality.

Based upon analytical evaluation of oil samples from various stages of refining and bleaching, it can be stated that the refining losses are directionally lower and there is no significant difference in oil quality when potassium hydroxide is used in place of sodium hydroxide at normal processing conditions.

Upon review of the analytical data generated from this study, it is recommended that potassium hydroxide be regarded as a viable neutralizing agent in the refining of soybean oil, and that its use in Bunge Foods refineries be considered.

Results and Discussions

For oil refined using KOH:

1. Refined and bleached colors were comparable to those of NaOH refined oil
2. Phosphorus content of RB oil was within determined acceptable limits
3. Neutral oil in soapstock values showed a trend of being lower than those of NaOH refined oil
4. Total Fatty Acids (TFA) in soapstock were comparable to NaOH refined soapstocks
5. Fatty acid composition of refined oil was the same as NaOH refined oil
6. Refined, bleached peroxide values (PV) were lower than NaOH refined
7. Hach values were comparable to NaOH refined samples
8. Losses were acceptable in comparison to NOL and directionally lower than NaOH refined oil losses
9. The anticipated decrease in primary back pressure, seen in previous commercial KOH refining trials, was not realized
10. Soapstock was darker colored and had a more fluid consistency Conclusion Based on the analytical data and observations of the processing trial, it can be solidly concluded that potassium hydroxide is a viable alternative to sodium hydroxide for soybean oil refining; showing no measurable difference in quality while providing improvement in losses.

Bunge Foods KOH Refining Bench-top Study

A bench-top comparison between refining with KOH versus NaOH was performed in R&D. Soybean oil with phosphoric acid added was refined in two batches, one using KOH and the other NaOH. The refined oil was then washed and bleached. After refining, the KOH oil was noticeably darker than the NaOH oil and there was no visible floc. There was, however, a dark gelatinous substance which had settled to the bottom of the beaker. The NaOH refined soapstock appeared as usual. It is likely that the losses will be slightly higher using KOH. The water washed oils and similar color, but the KOH refined had a much more definite film on the top after sitting overnight in the 180° F. oven. This film was scraped off before bleaching. Both samples bleached well and their colors were read on the Lovibond AOCS Tintometer as 30Y/2.2R and 30Y/2.5R, KOH and NaOH refined.

Bunge Foods KOH Refining Trial Fort Worth, Tex.

We began pulling from the KOH tote (300 gal., 45% conc) at 7:15 a.m. and completed the standard start up checks. The crude oil flow was set to 28,000 pph. We began to get negative caustic readings on the monitor and determined the pump did not have enough suction to put from the tote. We shut down to bring the caustic up to the pump and re-started the system. Density through the EXAC meter was 1.099 g/cc. At 8:15 a.m. the caustic strength was measured at 11.9% and the crude/caustic mixture was being sent through one retention mixer. At 9:30 a.m. samples were taken and the density read off the EXAC as 1.1014 g/cc. At 10:00 a.m. the back pressure was increased from 67 to 70 psi due to the increase in soap coming of the water wash centrifuge. We checked the FFA of the incoming crude and found that it had increased from 0.68 to 0.78. Total crude flow to this point was 92,000 pounds. We adjusted the caustic flow and treat to compensate for this rise. At 11:15 a.m. we switched to a higher excess concentration (0.07) due to dry foots conditions. We stabilized at these conditions for approximately 3 hours until we noticed a change in the foots and gradually backed the excess down to 0.056 for the remainder of the run.

Samples of the NaOH and KOH oils refined out of the same crude tank were taken at the following stages: crude, crude+phosphoric acid, primary centrifuge outlet, water was centrifuge outlet, and refined, bleached oil. Was water was also sampled. These samples were analyzed.

The preliminary observations are satisfactory. The losses were not appreciably higher for the KOH refined oil, and the soapstock and color behaved as predicted. We did not, however, experience the decrease in primary back pressure that was seen in other commercial refining trials using KOH.

KOH Concentration Calculation

For a 14 Baume solution:]
14 Be=(10.56 g NaOH/100 g H$_2$O)×(56.1065 g KOH/39.9971 g NaOH)
14 Be=14.81 g KOH/100 g H$_2$O
14 Be=14.81 g KOH/114,81 g solution=12.9% KOH solution KOH Addition Level (Equimolar)
For 14 Blaume $$\frac{\text{g KOH } sol'n}{\text{g oil}} = \frac{\text{g NaOH } sol}{\text{g oil}} \times \frac{9.55 \text{ g NaOH}}{100 \text{ g NaOH } sol'n} \times$$

$$\frac{56.1065 \text{ g KOH/mol}}{39.9971 \text{ g NaOH/mol}} \times \frac{1/12.9 \text{ g KOH}}{100 \text{ g } sol'n}$$

$$= 1.0384 \times \frac{\text{g NaOH } sol'n}{\text{g oil}}$$

Further Discussion of POS Pilot Plant Corp Study

Of significant interest were the results of the soaps found in the refined oil before washing with water. POS reported the following:

| 1. Canola Oil | NaOH 54 |
| | KOH 28 |
| 2. Soybean Oil | NaOH 116 |
| | KOH 26 |
| 3. Corn Oil | NaOH 308 |
| | KOH 74 |

The numbers are parts per million (ppm) of soap found in the oils refined with NaOH and KOH respectively.

What is potentially so significant is that the standard for soaps in oil is less than 50 ppm. The data indicates that a water wash of the oils refined with potassium hydroxide (KOH) may not be needed! A significant, and most unexpected, improvement over the current state-of-the-refining-art. The wash step my be eliminated, thus saving substantial shipping and disposal costs.

The laboratory refining experiments using a bucket centrifuge will show lower ppm's soaps in both cases (NaOH and KOH refined oils) than a full scale plant operation using high speed disc centrifuges.

In any case, the fact that lower soaps were found in the KOH refined oils will extrapolate to a full scale operation. This, while perhaps not eliminating the water wash step, may allow a reduction in the water needed thus still saving shipping and disposal costs.

Workers in the art thought that potassium soaps may be more soluble in oil than sodium soaps. This would necessitate additional water washings in order to remove the excess soaps from the oil. This would cause the process to be less economical because of the disposal and shipping costs associated with the water (acid-water) fraction of soapstock.

The results obtained show that most likely the industry as a whole was thinking in a manner directly opposed to the direction that is indicated by the present invention and disclosure.

Further Advantages of KOH Refining

The possible elimination or at least the improvement in water wash characteristics of KOH refined oils vs. the traditional caustic, NaOH is an unexpected result. The water wash step of once refined oils to remove traces of soaps is expensive and problematic. It causes an effluent problem (W. R. Grace in their brochure on TRISYL" state the case) and increases the costs of transporting soapstock in a dilute form to the acidulation site. Also the economics of fertilizer production of the present invention are improved in that a more concentrated solution (less water has to be evaporated and shipping costs of a dilute mix are reduced).

Also more concentrated (i.e., less or no wash water added) soapstock may be easier to partially acidulate and dehydrate. This may allow the production of NDSS (neutralized-dehydrated soapstock) to become feasible in a commercial sense. The major problem with putting "soapstock" on the meal is the water content which causes the soap-meal mixture to ferment. Also water lowers the overall protein content (i.e., is a valueless diluant) and causes the costs of transportation to increase.

Increase Salt Content of Acid Water

Emulsion formation (a real problem in acidulation of soapstock) is suppressed by increasing the salt content of the acid water. There is a prior process in which sodium sulfate solution is recycled back to the acidulation chamber after drawing off acid oil-fatty acids. A further aspect of the present invention would allow for the beneficial action of increasing salt concentration (i.e., ionic strength) by not drawing off the acid oil layer (i.e., separating the acid oil from the acid water) before neutralizing the acid water with a nutrient base. The acidulation can be performed causing a split, but the neutralization can proceed with the two phases (oil and water) intact. In this way the addition of ammonia or salts for fertilizer can benefit the eventual separation of acid oil and acid water (neutralized . . . "fertilizer").

Acidulating/Transporting Vessel

The present invention also involves a railcar, truck or barge which is self contained with regard to acidulation capability. In this way the soapstock can be acidulated in the transporting vessel and be ready for off-loading or neutralization (also in the vessel) of acid oil, acid water or fertilizer. The soapstock will not store well (only a few days) but acid oil and acid water can be stored almost indefinitely. The vessel should be constructed of an acid resistant material and also be able to withstand the heats of neutralization and steam addition or cleaning. The above is the answer for storing fertilizer over the winter. You only acidulate and remove acid oil, don't neutralize until ready to use.

Clearly, minor changes may be made in the form and construction of this invention without departing from the material spirit of it. Therefore, it is not desired to confine the invention to the exact form shown here and described, but it is a desired to include all subject matter which properly comes within the scoped claimed.

What is claimed is:

1. In a process of refining crude agricultural oils in which neutralized oil is first separated from the soapstock by addition of a base, the improvement comprising the steps of:
   a. beginning with a commercial scale quantity of crude agricultural oil,
   b. mixing the oil with an effective amount of predominantly potassium hydroxide solution as the refining base, and
   c. separating preliminarily refined oil from the resulting soapstock to produce commercial scale quantities of neutralized oil and soapstock.

2. A process as recited in claim 1, further characterized by the fact that: the base employed consists essentially of potassium hydroxide solution.

3. A process as recited in claim 2, further characterized by the fact that the separating step is carried out continuously.

4. A process as recited in claim 3, further characterized by the fact that the separating step is carried out by continuous centrifugation.

5. A process as recited in claim 1, wherein the refined oil is subjected to purification by one or more water wash cycles and further characterized by the fact that: significantly fewer cycles are used to obtain desired purity when compared with a process in which sodium hydroxide is employed as the base.

6. A process as recited in claim 1, wherein the refined oils is subjected to one or more water wash cycles and further characterized by the fact that: significantly less water is used per cycle to obtain desired purity when compared with a process in which sodium hydroxide is employed as the base.

7. A process as recited in claim 1, further characterized by the fact that: the refined oil has a higher degree of clarity then in a process in which sodium hydroxide is employed as a base.

8. A process as recited in claim 1, further characterized by the fact that: significantly more refined oil is separated from the crude oil when compared with a process in which sodium hydroxide is employed as the base.

9. A process as recited in claim 1, further characterized by the fact that: significantly less oil appears in the soapstock than in a process in which sodium hydroxide is employed as the base.

10. A process as recited in claim 1, in which an interlayer forms and further characterized by the fact that there is a significant reduction in the volume of the interlayer compared with a process in which sodium hydroxide is employed as the base.

11. A process as recited in claim 1, further characterized by the fact that: there is a significant reduction in the viscosity of the soapstock when compared with a process in which sodium hydroxide is employed as the base.

12. A process as recited in claim 1, further characterized by the fact that: there is significantly lower soap content in the separated oil when compared with a process in which sodium hydroxide is employed as the base.

13. A process as recited in claim 1, further characterized by the fact that: there is a significantly lower soap content in water-washed oil when compared with a process in which sodium hydroxide is employed as the base.

14. A process as recited in claim 1, further characterized by the fact that: there is significantly lower trace impurities in the refined oil when compared with a process in which sodium hydroxide is employed as the base.

15. A process as recited in claim 1, further characterized by the fact that: there is significantly reduced volume of bleaching earths or the like required when compared with a process in which sodium hydroxide is employed as the base.

16. A process as recited in claim 1, further characterized by the fact that: there is lower Lovibond Red color when compared with a process in which sodium hydroxide is employed as the base.

17. A process as recited in claim 1, further characterized by the fact that: there is significantly lower chlorophyll content in the separated oil when compared with a process in which sodium hydroxide is employed as the base.

18. A process as recited in claim 1, further characterized by the fact that: there is lower mono- and di-glycerides in neutralized oil when compared with a process in which sodium hydroxide is employed as the base.

19. A process as recited in claim 1, further characterized by the fact that: there is higher retention of tocopherols in the refined oil when compared with a process in which sodium hydroxide is employed as the base.

20. The neutralized oil of claim 1 in which the concentrations of impurities is significantly less when compared with a process in which sodium hydroxide is employed as the base.

21. The soapstock of claim 1 in which the concentration of neutral oil is significantly less when compared with a process in which sodium hydroxide is employed as the base.

* * * * *